(12) United States Patent
Burnham et al.

(10) Patent No.: US 7,756,371 B1
(45) Date of Patent: Jul. 13, 2010

(54) OPTICAL FIBER INTERCONNECTION DEVICES AND SYSTEMS USING SAME

(75) Inventors: William R. Burnham, Hickory, NC (US); Terry L. Cooke, Hickory, NC (US); David L. Dean, Jr., Hickory, NC (US); Tory A. Klavuhn, Newton, NC (US); Alan W. Ugolini, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/362,508

(22) Filed: Jan. 30, 2009

(51) Int. Cl.
*G02B 6/26* (2006.01)
*G02B 6/42* (2006.01)

(52) U.S. Cl. ............... 385/51; 385/15; 385/24; 385/31; 385/39; 385/50; 385/59; 385/70; 385/71; 385/75; 398/55; 398/56; 398/57; 398/140; 398/141; 398/165

(58) Field of Classification Search ............ 385/24, 385/51; 398/56
See application file for complete search history.

(56) References Cited

U.S. PATENT DOCUMENTS

| | | | | |
|---|---|---|---|---|
| 5,136,674 A | * | 8/1992 | Kakiuchi et al. | 385/115 |
| 5,204,925 A | * | 4/1993 | Bonanni et al. | 385/89 |
| 5,394,503 A | | 2/1995 | Dietz et al. | 385/135 |
| 6,498,882 B1 | * | 12/2002 | Buckelew et al. | 385/114 |
| 6,549,710 B2 | * | 4/2003 | Simmons et al. | 385/121 |
| 6,694,083 B2 | | 2/2004 | Paradiso et al. | 385/135 |
| 6,758,600 B2 | * | 7/2004 | Del Grosso et al. | 385/71 |
| 6,869,227 B2 | | 3/2005 | Del Grosso et al. | 385/71 |
| 6,873,772 B2 | * | 3/2005 | Nakaya | 385/114 |
| 7,237,966 B2 | * | 7/2007 | Quinby et al. | 385/78 |
| 7,391,952 B1 | | 6/2008 | Ugolini et al. | 385/135 |
| 2003/0174953 A1 | * | 9/2003 | Carnevale et al. | 385/39 |
| 2008/0175553 A1 | * | 7/2008 | Hendrickson et al. | 385/135 |
| 2009/0180737 A1 | * | 7/2009 | Burnham et al. | 385/59 |

FOREIGN PATENT DOCUMENTS

WO WO02/44782 A2 6/2002

* cited by examiner

*Primary Examiner*—Ryan Lepisto

(57) ABSTRACT

Optical fiber interconnection devices, which can take the form of a module, are disclosed that include an array of optical fibers and multi-fiber optical-fiber connectors, for example, a twenty-four-port connector or multiples thereof, and three eight-port connectors or multiples thereof. The array of optical fibers is color-coded and is configured to optically interconnect the ports of the twenty-four-port connector to the three eight-port connectors in a manner that preserves transmit and receive polarization. In one embodiment, the interconnection devices provide optical interconnections between twenty-four-fiber optical connector configurations to eight-fiber optical connector configurations, such as from twenty-four-fiber line cards to eight-fiber line cards, without having to make structural changes to cabling infrastructure. In one aspect, the optical fiber interconnection devices provide a migration path from duplex optics to parallel optics.

20 Claims, 16 Drawing Sheets

OPTICAL FIBER INTERCONNECTION DEVICES AND SYSTEMS USING SAME

FIELD

The disclosure relates to optical fiber interconnection devices configured to and methods for interconnecting multi-fiber optical fiber connectors. One exemplary embodiment connects one 24-fiber connector, or multiples thereof, with three 8-fiber connectors, of multiples thereof.

TECHNICAL BACKGROUND

Conventional fiber optic cables comprise optical fibers that conduct light used to transmit voice, video, and data information. An optical ribbon includes a group of optical fibers that are coated with a ribbon common layer, which is typically referred to as a ribbon matrix material. Typically, such a ribbon matrix material is extruded about a group of individually colored optical fibers that have been arranged in a planar array, and is then irradiated with a UV light source that cures the ribbon matrix material. The cured ribbon matrix material protects the optical fibers and generally aligns the respective positions of optical fibers in the planar array. Optical fiber ribbons can be connected to multi-fiber connectors, for example, MTP connectors. MTP connectors can be used in local-area network (LAN) applications, for example, data centers and parallel optics interconnects between servers.

Conventional networking solutions, which utilize a 12-fiber MTP connector assembly for example, are often configured in a point to point system. Fiber polarity (i.e., the transmit and receive functions of a given fiber) is addressed by flipping fibers in one end of the assembly just before entering the MTP connector in an epoxy plug, or by providing "A" and "B" type break-out modules where the fiber is flipped in the "B" module and straight in the "A" module. Optical polarity modules that provide fiber optic interconnection solutions for MTP connectors in a network environment are discussed in U.S. Pat. Nos. 6,758,600 and 6,869,227, which patents are assigned to the present Assignee and which patents are incorporated by reference herein.

In a traditional network environment that includes a data center, floor space (e.g. the 24"×24" raised floor tile within a data center) comes at a very expensive premium. Further, the vertical space (identified as a 1.75" rack space) within the floor space also comes at a premium. Therefore, each time passive and active fiber-optic equipment completely fills this space, new space is required for the system to grow. In addition, the space being used is already stuffed with a high-density of components.

Consequently, it is difficult to effectively manage the cabling in data centers for such networks. This is particularly true for Storage Area Networks (SANs) that utilize SAN directors having high-density input/output ("I/O") interfaces called "line cards." Line cards hold multiple optical transceivers that convert optical signals to electrical signals and vice versa. The line cards have connector ports into which network cabling is plugged. The number of ports per line card can vary, e.g., 16, 32 and 48 port line cards are available. Complicating matters is the use of line cards with non-matching port counts (e.g., port counts not having even increments of 12-fibers) so that some fibers in the ribbon cable assembly end up not connected to a connector port. For example, it is sometimes desirable to use line cards with 16 and 32 port counts, but these are not directly suitable for use with 12-fiber-based cabling systems. What is needed is a universal conversion module that efficiently converts one 24-fiber connector configuration (or multiples thereof) to three 8-fiber connector configurations (or multiples thereof), in a manner that takes into account the polarity of the fibers.

SUMMARY

One exemplary aspect is a 3x8f↔24f optical interconnection device ("3x8f↔24f device") that can be in the form of a module. The 3x8f↔24f device includes a twenty-four-port connector ("24-port connector") having ports $P_{24}(i)$ for i=1 to 24. The 3x8f↔24f device also includes first, second and third eight-port connectors respectively having ports $1P_8(j)$, ports $2P_8(j)$, and ports $3P_8(j)$, for j=1 to 8. An array of optical fibers called a "harness" is configured to connect the ports as follows (where $\{a1, b1 \ldots\} \leftrightarrow \{a2, b2 \ldots\}$ denotes connecting a1 to a2, b1 to b2, etc), for j=1 to 8:

i. $\{1P_8(j)\} \leftrightarrow \{P_{24}(1), P_{24}(23), P_{24}(3), P_{24}(21), P_{24}(5), P_{24}(19), P_{24}(7), P_{24}(17)\}$;

ii. $\{2P_8(j)\} \leftrightarrow \{P_{24}(9), P_{24}(15), P_{24}(11), P_{24}(13), P_{24}(2), P_{24}(24), P_{24}(4), P_{24}(22)\}$; and iii. $\{3P_8(j)\} \leftrightarrow \{P_{24}(6), P_{24}(20), P_{24}(8), P_{24}(18), P_{24}(10), P_{24}(16), P_{24}(12), P_{24}(14)\}$.

A second exemplary aspect is a method of optically interconnecting a first 24-port connector having ports $P_{24}(i)$ for i=1 to 24, to first, second and third eight-port connectors having respective ports $1P_8(j)$, ports $2P_8(j)$, and ports $3P_8(j)$, the method comprising configuring an array of optical fibers to connect the ports as follows, for j=1 to 8:

i. $\{1P_8(j)\} \leftrightarrow \{P_{24}(1), P_{24}(23), P_{24}(3), P_{24}(21), P_{24}(5), P_{24}(19), P_{24}(7), P_{24}(17)\}$;

ii. $\{2P_8(j)\} \leftrightarrow \{P_{24}(9), P_{24}(15), P_{24}(11), P_{24}(13), P_{24}(2), P_{24}(24), P_{24}(4), P_{24}(22)\}$; and iii. $\{3P_8(j)\} \leftrightarrow \{P_{24}(6), P_{24}(20), P_{24}(8), P_{24}(18), P_{24}(10), P_{24}(16), P_{24}(12), P_{24}(14)\}$.

A third exemplary aspect is an optical fiber interconnection device in the form of a module. The modular device includes an enclosure defining an interior region. At least one 24-port connector is operably connected to the enclosure and has ports $P_{24}(1)$ for i=1 to 24. At least one set of first, second and third eight-port connectors are operably connected to the enclosure and respectively have ports $1P_8(j)$, ports $2P_8(j)$ and ports $3P_8(j)$. At least first and second sets of twelve optical fibers having a color-code are contained within the interior region and are optically connected to ports $P_{24}(1)$ through $P_{24}(24)$. The first and second sets of color-coded optical fibers are configured to connect the ports as follows, for j=1 to 8:

i. $\{1P_8(j)\} \leftrightarrow \{P_{24}(1), P_{24}(23), P_{24}(3), P_{24}(21), P_{24}(5), P_{24}(19), P_{24}(7), P_{24}(17)\}$;

ii. $\{2P_8(j)\} \leftrightarrow \{P_{24}(9), P_{24}(15), P_{24}(11), P_{24}(13), P_{24}(2), P_{24}(24), P_{24}(4), P_{24}(22)\}$; and iii. $\{3P_8(j)\} \leftrightarrow \{P_{24}(6), P_{24}(20), P_{24}(8), P_{24}(18), P_{24}(10), P_{24}(16), P_{24}(12), P_{24}(14)\}$.

Figure 1:
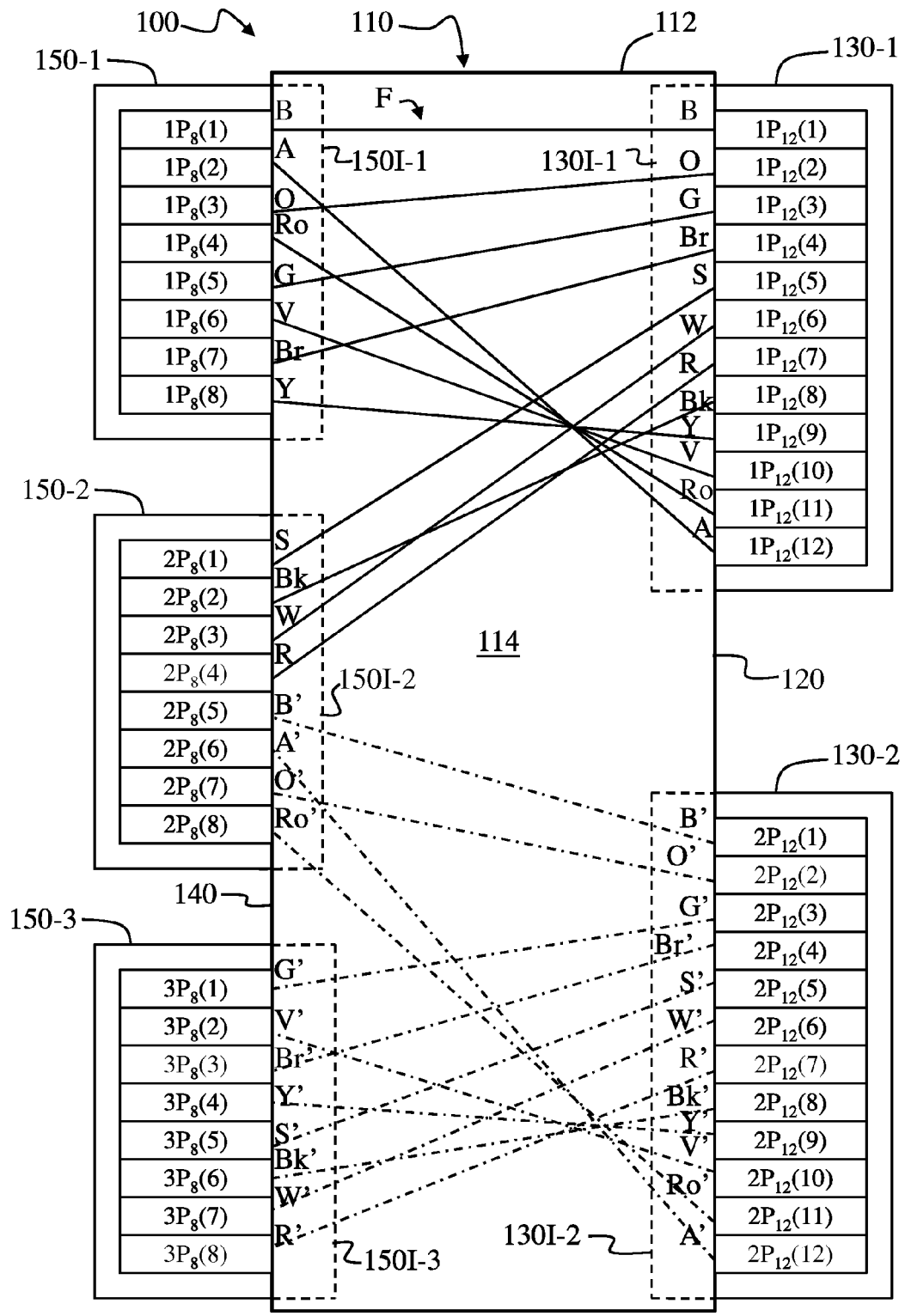
FIG. 1 is a schematic diagram of an example embodiment of an 3x8f↔12f optical fiber interconnection device ("3x8f↔12f device") illustrating a modular form of the device, wherein optical fiber ("harness") wiring connects two 12-fiber connectors with three 8-fiber connectors in a configuration that maintains fiber polarization.

It is to be understood that both the foregoing general description and the following detailed description present embodiments of the disclosure, and are intended to provide an overview or framework for understanding the nature and character of the same. The accompanying drawings are included to provide a further understanding, and are incorporated into and constitute a part of this specification. The drawings illustrate the various exemplary embodiments, and together with the description serve to explain the principals and operations of the same.

DETAILED DESCRIPTION

Reference is now made in detail to the present preferred embodiments, examples of which are illustrated in the accompanying drawings. Whenever possible, like or similar reference numerals are used throughout the drawings to refer to like or similar parts. It should be understood that the embodiments disclosed herein are merely examples, each incorporating certain benefits discussed herein. Various modifications and alterations may be made to the following examples, and aspects of the different examples may be mixed in different ways to achieve yet further examples. Accordingly, the true scope is to be understood from the entirety of the present disclosure, in view of but not limited to the embodiments described herein.

A first aspect is directed to an optical fiber interconnection (or "conversion") device configured to convert or otherwise interconnect two connectors (or n multiples thereof) each having twelve fibers (and thus twelve ports and referred to as "12f" connectors) to three connectors (or n multiples thereof) each having an eight fibers (and thus eight ports and referred to as "8f" connectors). This conversion device is referred to below as the "3x8f↔12f optical fiber interconnection device" or "the 3x8f↔12f device" for short.

Another aspect is directed to an optical fiber interconnection device configured to convert or otherwise interconnect one connectors (or n multiples thereof) each having twenty-four fibers (and thus twenty-four ports and referred to as a "24f" connector) to three 8f connectors (or n multiples thereof). This conversion device is referred to below as the "3x8f↔24f optical fiber interconnection device" or "the 3x8f↔24f device" for short.

In the discussion below and in the claims, the notation {a1, b1, c1 ... } ↔ {a2, b2, c2 ... } denotes connecting a1 to a2, b1 to b2, c1 to c2, etc. The conversion device works with either universal routing or classic routing. It also works with n multiples of this configuration (n=1, 2, 3, ...), i.e., n sets of three 8f connectors and either n sets of two 12f connectors or n sets of 24f connectors.

The 3x8f↔12f device and the 3x8f↔24f device can include arrays of optical fiber connectors, and can take the form of an individually formed enclosure with one or more walls in module form, a flexible substrate with optical fibers associated therewith, and an optical fiber harness or bundles of arrayed optical fibers and connectors, and on the other hand, the devices can include combinations of the foregoing.

The term "harness" means a collection of optical fibers, including being bound in groups or sub-groups as by a wrapping, adhesive, tying elements, or other suitable collecting fixtures or devices, or the harness may comprise optical fibers that are unbound, for example, loose optical fibers without tying elements. Most preferably, the optical fibers are arranged in the form of optical fiber ribbons, and the optical fiber ribbons are collected together by one or more tying elements. In exemplary embodiments, the 24f, 12f and 8f connectors are referred to below as either "twenty-four-fiber" or "twenty-four port," connectors, "twelve-fiber" or "twelve-port" connectors, or "eight-fiber" or "eight-port" connectors, respectively.

The 3x8f↔12f Device

FIG. 1 is a schematic diagram of an example embodiment of an example 3x8f↔12f device 100. The example 3x8f↔12f device 100 of FIG. 1 includes an interconnection unit 110 in the form of a module and that provides the device with a modular function. Interconnection unit 110 is thus also referred to below as an "interconnection module" or just "module." In an example embodiment, interconnection unit 110 is formed by at least one wall 112 that in an example embodiment defines an enclosure having an interior cavity 114 for receiving and supporting optical fibers and connectors as discussed below. In example embodiments discussed in greater detail below, interconnection unit 110 includes a single "wall" 112 in the form of a cylindrical jacketed cable. In another example embodiment, interconnection unit 110 is a polygonal- (e.g., rectangular-) cross-section jacketed cable. In other example embodiments disclosed below, device 100 does not include a modular enclosure 112.

In the example embodiment shown in FIG. 1, interconnection unit 110 has a number of walls 112 that form a rectangular-cross-section enclosure. Interconnection unit 110 includes a side 120 that includes two 12f connectors 130 (namely 130-1 and 130-2) and an opposite side 140 that includes three 8f connectors 150 (namely, 150-1, 150-2 and 150-3). In an example embodiment, 8f connectors 150 and 12f connectors 130 are or include MTP-type or MTO-type connectors. In an example embodiment, connectors 130 and 150 are 12-port connectors, wherein for the 8f connectors 150 only 8 of the 12 ports are used.

The 12f connectors 130 each have ports $P_{12}(i)$, where the subscript "12" denotes the total number of ports and $i=1, 2, 3 \ldots 12$, and indicates the $i^{th}$ port. Connector ports for 12f connector 130-1 are denoted $1P_{12}(i)$ while connector ports for 12f connector 130-2 are denoted $2P_{12}(i)$. Likewise, the 8f connectors 150 each have ports $P_8(j)$, where the subscript "8" denotes the total number of (active) ports and $j=1, 2, 3 \ldots 8$, and indicates the $j^{th}$ port. Connector ports for 8f connector 150-1, 150-2 and 150-3 are respectively denoted as $1P_8(j)$, $2P_8(j)$ and $3P_8(j)$. The connector ports $P_{12}$ of 12f connectors 130 are optically connected to select connector ports $P_8$ of 8f connectors 150 using an array of optical fiber sections F called a "harness" with the fiber sections F called the "harness fibers."

Harness fibers F are "wired" according to a color-coding scheme, e.g., the standard color-coding scheme used in telecommunications systems wherein B=blue, O=orange, G=Green, Br=Brown, S=Slate, W=White, R=Red, Bk=Black, Y=Yellow, V=Violet, Ro=Rose, and A=Aqua. Harness fibers F associated with connector 130-1 are shown as solid lines while the harness fibers associated with connector 130-2 are shown as dashed-dotted lines for ease of illustration. Also, the color codes associated with 12f connector 130-2 use primes (e.g., B', O', etc.) to distinguish from the colored fibers associated with 12f connector 130-1. The select harness wiring configuration between the ports $P_{12}$ of 12f connectors 130-1, 130-2 and ports $P_8$ of 8f connectors 150-1, 150-2, and 150-3 to establish the optical interconnection therebetween are discussed in detail below. The harness fibers can be arranged as such and may optionally be attached to a substrate, for example, a flexible substrate.

Note that in an example embodiment, harnesses fibers F are connected to connectors 130 and 150 via corresponding connectors 130I and 150I internal to interconnection unit 110. These are shown in phantom lines in FIG. 1 for the ease of illustration. In an example embodiment, connectors 130, 150, 130I and 150I are MTP connectors.

In an example embodiment, 12f connectors 130 and 8f connectors 150 are preferably epoxy and polish compatible multi-fiber connectors, for example, part of Corning Cable Systems' LANScape® connector solution set. The epoxy and polish connector is a 12f connector achieving very high density in a small space. It contains multiple optical paths, the optical paths being arranged in a generally planar array. The optical paths are immediately adjacent at least one other optical path for optical alignment with the optical fibers in an optical fiber ribbon. The MTP connector is designed for multi-mode or single-mode applications, and uses a push/pull design for easy mating and removal. The MTP connector can be the same size as a conventional SC connector, but provides twelve times the fiber density, advantageously saving cost and space. The MTP connector includes a key for proper orientation for registration with any required optical adapters. An optical connector adapter (not shown) can be disposed between the connector outside the module and a connector inside the module. However, other connection schemes can be used. Preferably, in an example embodiment, a ribbon fan-out kit is used to manage the optical fibers from between the connector inside the module and the connector stations.

3x8f↔12f Wiring Configuration

With continuing reference to FIG. 1, in 3x8f↔12f device 100, two sets of twelve harness fibers F denoted by the above-mentioned colors (and differentiated by unprimed and primed notation) interconnect select ports $1P_{12}(i)$ and $2P_{12}(i)$ to select ports $1P_8(j)$, $2P_8(j)$ and $3P_8(j)$ as shown. The port interconnections are summarized in the following Tables 1 through 3, where m=1 or 2 and is used to denote 12f connector 130-1 or 130-2 (i.e., connector 130-m and ports $mP_{12}(j)$).

TABLE 1

Wiring @ Connector 150-1

| Port $1P_8(j)$ | Port $1P_{12}(i)$ | Color |
|---|---|---|
| $1P_8(1)$ | $1P_{12}(1)$ | B |
| $1P_8(2)$ | $1P_{12}(12)$ | A |
| $1P_8(3)$ | $1P_{12}(2)$ | O |
| $1P_8(4)$ | $1P_{12}(11)$ | Ro |
| $1P_8(5)$ | $1P_{12}(3)$ | G |
| $1P_8(6)$ | $1P_{12}(10)$ | V |
| $1P_8(7)$ | $1P_{12}(4)$ | Br |
| $1P_8(8)$ | $1P_{12}(9)$ | Y |

TABLE 2

Wiring @ Connector 150-2

| Port $2P_8(j)$ | Port $mP_{12}(i)$ | Color |
|---|---|---|
| $2P_8(1)$ | $1P_{12}(5)$ | S |
| $2P_8(2)$ | $1P_{12}(8)$ | Bk |
| $2P_8(3)$ | $1P_{12}(6)$ | W |
| $2P_8(4)$ | $1P_{12}(7)$ | R |
| $2P_8(5)$ | $2P_{12}(1)$ | B' |
| $2P_8(6)$ | $2P_{12}(12)$ | A' |
| $2P_8(7)$ | $2P_{12}(2)$ | O' |
| $2P_8(8)$ | $2P_{12}(11)$ | Ro' |

TABLE 3

Wiring @ Connector 150-3

| Port $3P_8(j)$ | Port $2P_{12}(i)$ | Color |
|---|---|---|
| $3P_8(1)$ | $2P_{12}(3)$ | G' |
| $3P_8(2)$ | $2P_{12}(10)$ | V' |
| $3P_8(3)$ | $2P_{12}(4)$ | Br' |
| $3P_8(4)$ | $2P_{12}(9)$ | Y' |
| $3P_8(5)$ | $2P_{12}(5)$ | S' |
| $3P_8(6)$ | $2P_{12}(8)$ | Bk' |
| $3P_8(7)$ | $2P_{12}(6)$ | W' |
| $3P_8(8)$ | $2P_{12}(7)$ | R' |

The interconnections between ports $P_{12}$ and $P_8$ of connectors 130 and 150 can be described as follows:

For connector $1P_8(j)$: The odd ports ODD $\{1P_8(j)\}=1P_8(1)$, $1P_8(3)$, $1P_8(5)$ and $1P_8(7)$ are connected to respective ports $1P_{12}(1)$, $1P_{12}(2)$, $1P_{12}(3)$ and $1P_{12}(4)$, while the even ports EVEN $\{2 P_8(j)\} = 1P_8(2), 1P_8(4), 1P_8(6)$ and $1P_8(8)$ are connected to respective ports $1P_{12}(12), 1P_{12}(11), 1P_{12}(10)$ and $1P_{12}(9)$.

For connector $2P_8(j)$: The odd ports ODD $\{1P_8(j)\} = 2P_8(1), 2P_8(3), 2P_8(5)$ and $2P_8(7)$ are connected to respective ports $1P_{12}(5), 1P_{12}(6), 2P_{12}(1)$ and $2P_{12}(2)$, while the even ports EVEN $\{2P_8(j)\} = 2P_8(2), 2P_8(4), 2P_8(6)$ and $2P_8(8)$ are connected to respective ports $1P_{12}(8), 1P_{12}(7), 2P_{12}(12)$ and $2P_{12}(11)$.

For connector $3P_8(j)$: The odd ports ODD $\{1P_8(j)\} = 3P_8(1), 3P_8(3), 3P_8(5)$ and $3P_8(7)$ are connected to respective ports $2P_{12}(3), 2P_{12}(4), 2P_{12}(5)$ and $2P_{12}(6)$, while the even ports EVEN $\{3P_8(j)\} = 3P_8(2), 3P_8(4), 3P_8(6)$ and $3P_8(8)$ are connected to respective ports $2P_{12}(10), 2P_{12}(9), 2P_{12}(8)$ and $2P_{12}(7)$.

The above connections can be written in more compact form as:

i) $\{1P_8(1), 1P_8(3), 1P_8(5), 1P_8(7)\} \leftrightarrow \{1P_{12}(1), 1P_{12}(2), 1P_{12}(3), 1P_{12}(4)\}$;

ii) $\{1P_8(2), 1P_8(4), 1P_8(6), 1P_8(8)\} \leftrightarrow \{1P_{12}(12), 1P_{12}(11), 1P_{12}(10), 1P_{12}(9)\}$;

iii) $\{2P_8(1), 2P_8(3), 2P_8(5), 2P_8(7)\} \leftrightarrow \{1P_{12}(5), 1P_{12}(6), 2P_{12}(1), 2P_{12}(2)\}$;

iv) $\{2P_8(2), 2P_8(4), 2P_8(6), 2P_8(8)\} \leftrightarrow \{1P_{12}(8), 1P_{12}(7), 2P_{12}(12), 2P_{12}(11)\}$;

v) $\{3P_8(1), 3P_8(3), 3P_8(5), 3P_8(7)\} \leftrightarrow \{2P_{12}(3), 2P_{12}(4), 2P_{12}(5), 2P_{12}(6)\}$; and vi) $\{3P_8(2), 3P_8(4), 3P_8(6), 3P_8(8)\} \leftrightarrow \{2P_{12}(10), 2P_{12}(9), 2P_{12}(8), 2P_{12}(7)\}$.

The mapping of harness fibers F between ports $P_{12}$ and $P_8$ of respective connectors 130 and 150 can also be described in terms of the aforementioned color-coding scheme where $1P_{12}(i)$ and $2P_{12}(i)$ (for i=1 through 12) corresponds to the set $S_{12}$ of colored fibers for each of connectors 130-1 and 130-2, namely $1S_{12}=\{B, O, G, Br, S, W, R, Bk, Y, V, Ro, A\}$ and $2S_{12}=\{B', O', G', Br', S', W', R', Bk', Y', V', Ro', A'\}$. The corresponding sets $S_8$ for ports $1P_8(j)$ and $2P8(j)$ and $3P_8(j)$ (for j=1 through 8) of respective connectors 150-1, 150-2 and 150-3 are as follows: $1S_8=\{B, A, O, Ro, G, V, Br, Y\}$; $2S_8=\{S, Bk, W, R, B', A', O', Ro'\}$, and $3S_8=\{G', V', Br', Y', S', Bk', W', R'\}$. Thus, 3x8f↔24f device 100 can be said to "map" the colored fiber sets $1S_{12}$ and $2S_{12}$ associated with ports $1P_{12}$ and $2P_{12}$ of 12f connectors 130-1 and 130-2 to the colored fiber sets $1S_8$, $2S_8$ and $3S_8$ associated with ports $1P_8$, $2P_8$ and $3P_8$ of 8f connectors 150-1, 150-2 and 150-3.

The 3x8f↔12f device 100 also preserves polarity between connectors 130-1, 130-2 and 150-1, 150-2 and 150-3. Thus, if connectors 130-1 and 130-2 each have a polarity configuration for ports $P_{12}(i)$ of $POL_{12}(i)=\{T, R, T, R, T, R, T, R, T, R, T, R\}$, where T=transmit and R=receive, then the connectors 150-1, 150-2 and 150-3 each have a polarization configuration for ports $P_8(j)$ of $POL_8(j)=\{T, R, R, T, T, R, R, T\}$. Thus, each connector 130 and 150 has the same number of transmit T ports as receive R ports. The 3x8f↔12f device 100 thus provides polarization-preserving parallel optics solutions for performing the interconnection $\{(2n)\times 12f\} \leftrightarrow \{(3n)\times 8f\}$.

Figure 2A:
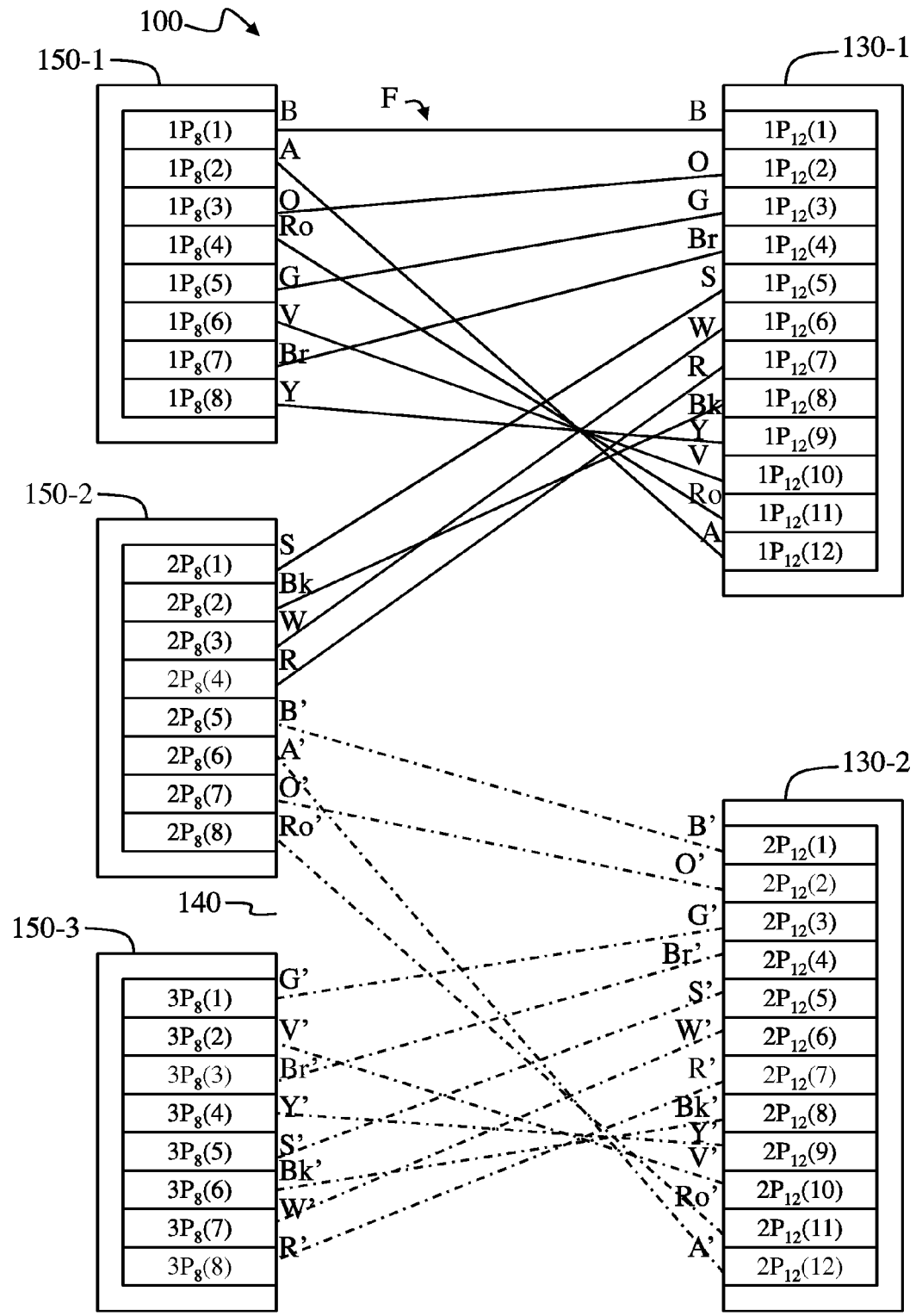
FIG. 2A is a schematic diagram of an example embodiment of the 3x8f↔12f device that does not include an enclosure.

A module or enclosure and associated wall or box structure is not required. For example, FIG. 2A illustrates an example embodiment of 3x8f↔12f device 100 in the form of the optical fiber harness F and connectors 130 and 150. In this case, the harness, or the harness and the connectors can be attached or supported with an optional substrate, for example, a flexible substrate made of thermoplastic.

Figure 2B:
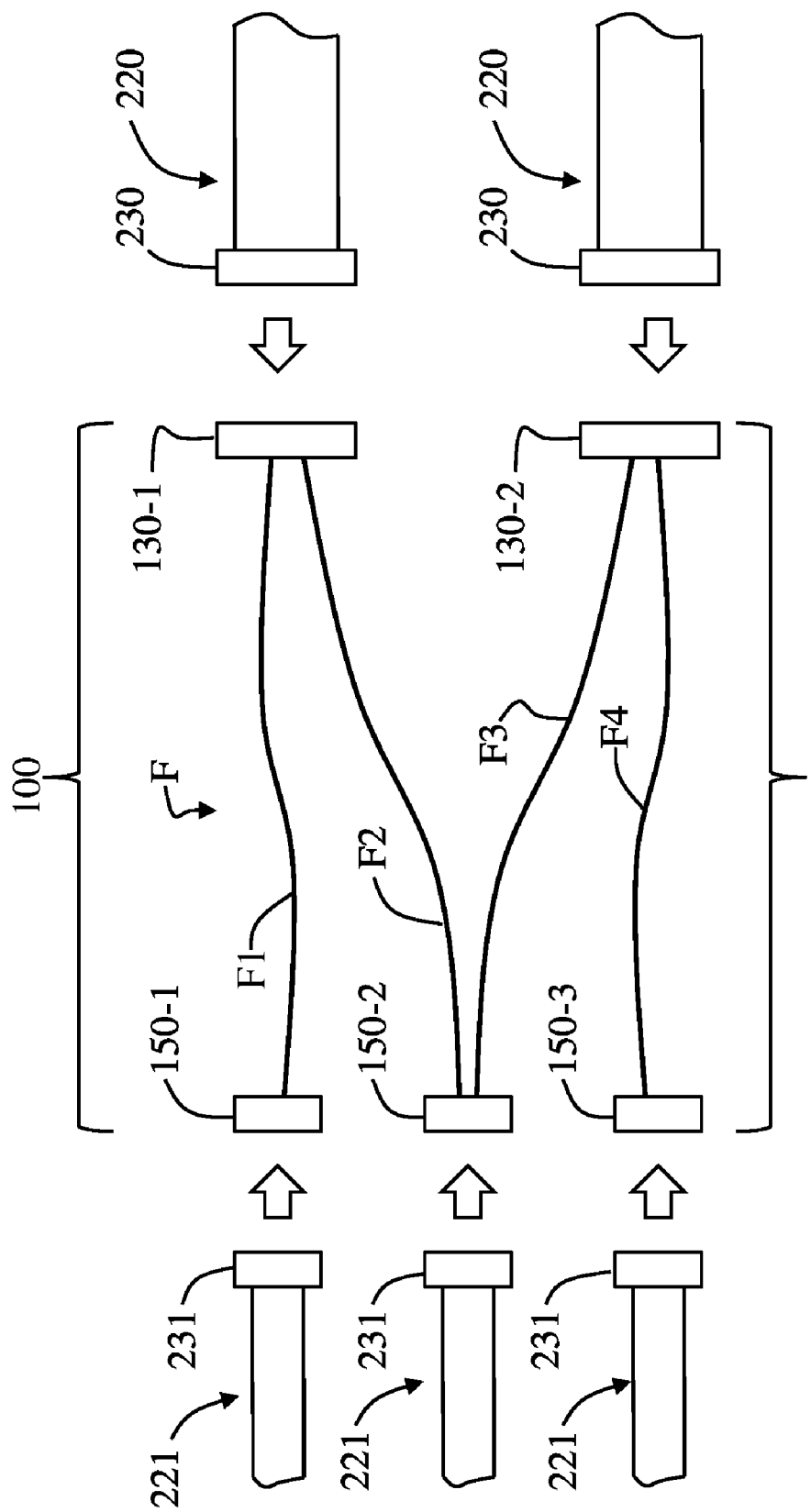
FIG. 2B is a schematic diagram illustrating the 3x8f↔12f device of FIG. 2A as used to connect to external devices in the form of 8-fiber and 12-fiber fiber optic cables.

FIG. 2B shows how 3x8f↔12f device 100 of FIG. 2A connects to devices in the form of 12f trunk cables 220 each having the exemplary 12f connector 230 and 8f trunk cables 221 each having an 8f connector 231. Harness fibers F are shown as divided into four groupings or cablings F1 through F4, where F1={B, A, O, Ro, G, V, Br, Y}, F2={S, Bk, W, R}, F3={B', A', O', Ro'}, and F4={G', V', Br', Y', S', Bk', W', R'}.

3x8f↔12f Optical Interconnection System

Figure 3:
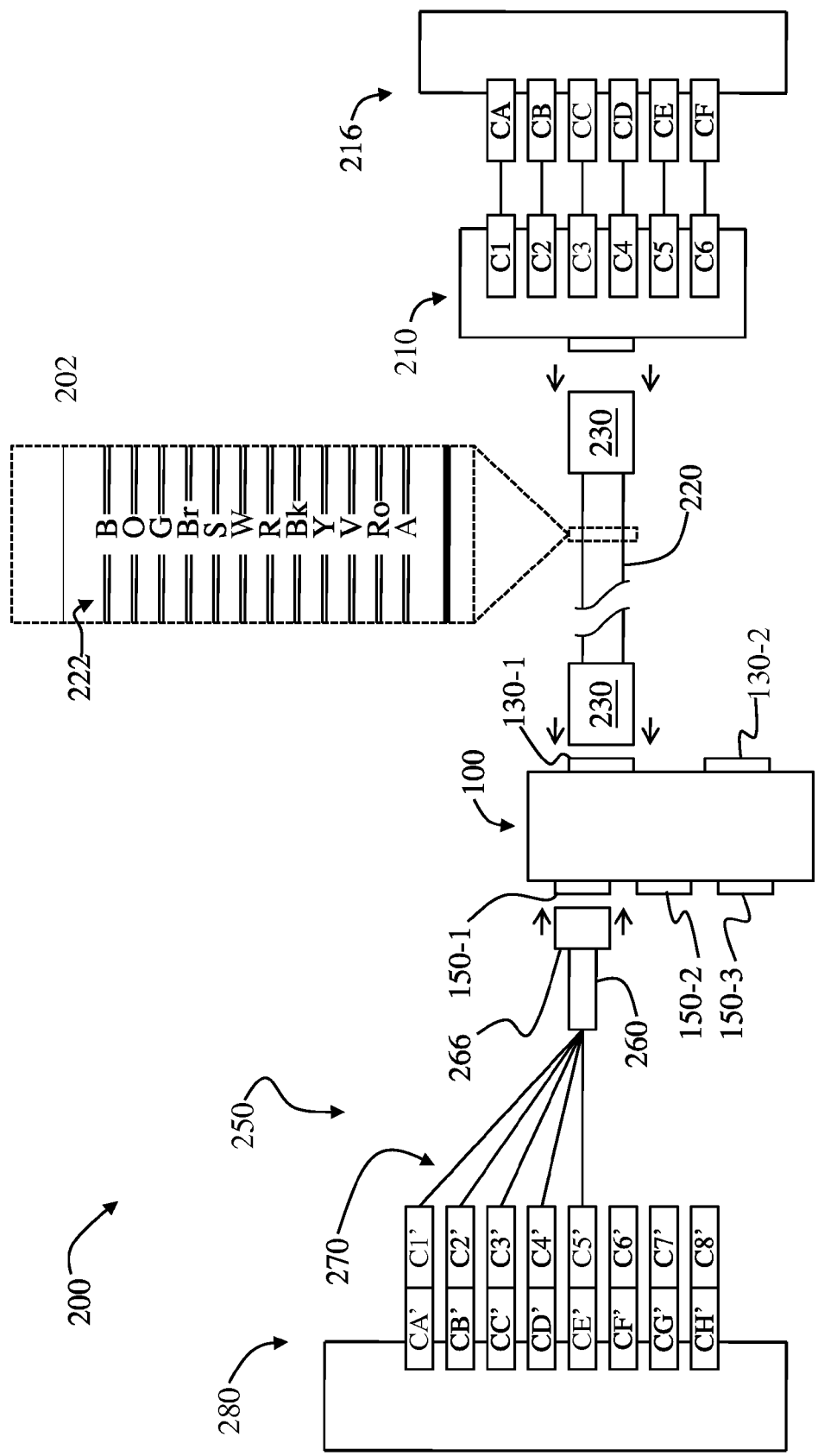
FIG. 3 is a schematic diagram of an optical interconnection system that utilizes the 3x8f↔12f device.

FIG. 3 is a schematic diagram of an optical interconnection system 200 that utilizes the 3x8f↔12f device 100. System 200 may be used, for example, as part of an optical network, such as a LAN or a SAN at an optical telecommunications data center.

System 200 includes a first optical fiber interconnection module 210 shown in more detail in FIG. 4 and discussed in greater detail below. The first interconnection module 210 is of the type discussed in the aforementioned U.S. Pat. Nos. 6,869,227 and 6,758,600. First interconnection module 210 is optically connected to a fiber optic cable 220 that carries optical fibers 222 referred to herein as "cable fibers." Fiber optic cable 220 as used in the present embodiment is also called a "universal trunk" and in an example embodiment is a ribbon array cable terminated at both ends with one or more connectors 230. In an example embodiment, connectors 230 are MTP connectors. In one example embodiment, cable 220 has 72 fibers 222 and six MTP connectors 230 at each end, while in another example embodiment, the cable has 12 fibers and a single MTP connector at each end. Other arrangements with suitable multiples of connectors are also envisioned. The inset in FIG. 3 shows an example embodiment of a twelve-fiber trunk cable 220 along with example color designations for cable fibers 222. Trunk cable 220 includes a single connector 230 at each of its ends.

Trunk cable 220 is connected to 3x8f↔12f device 100 via trunk cable connector 230 mating with one of connectors 130-1 or 130-2. System 200 includes a fiber harness 250 having a fiber optic cable 260 that includes at one end an 8f connector 266 and at the other end eight separate single-fiber connectors C1' through C8' respectively connected to a the eight fiber optical fibers 270 carried in cable 260. The eight fibers 270 in cable 260 are connected via connector 266 to 3x8f↔12f device 100 at connector 150-1 and thus correspond to ports $1P_8(1)$ through $1P_8(8)$ having associated therewith the respective colors {B, A, O, Ro, G, V, Br, Y}.

Figure 4:
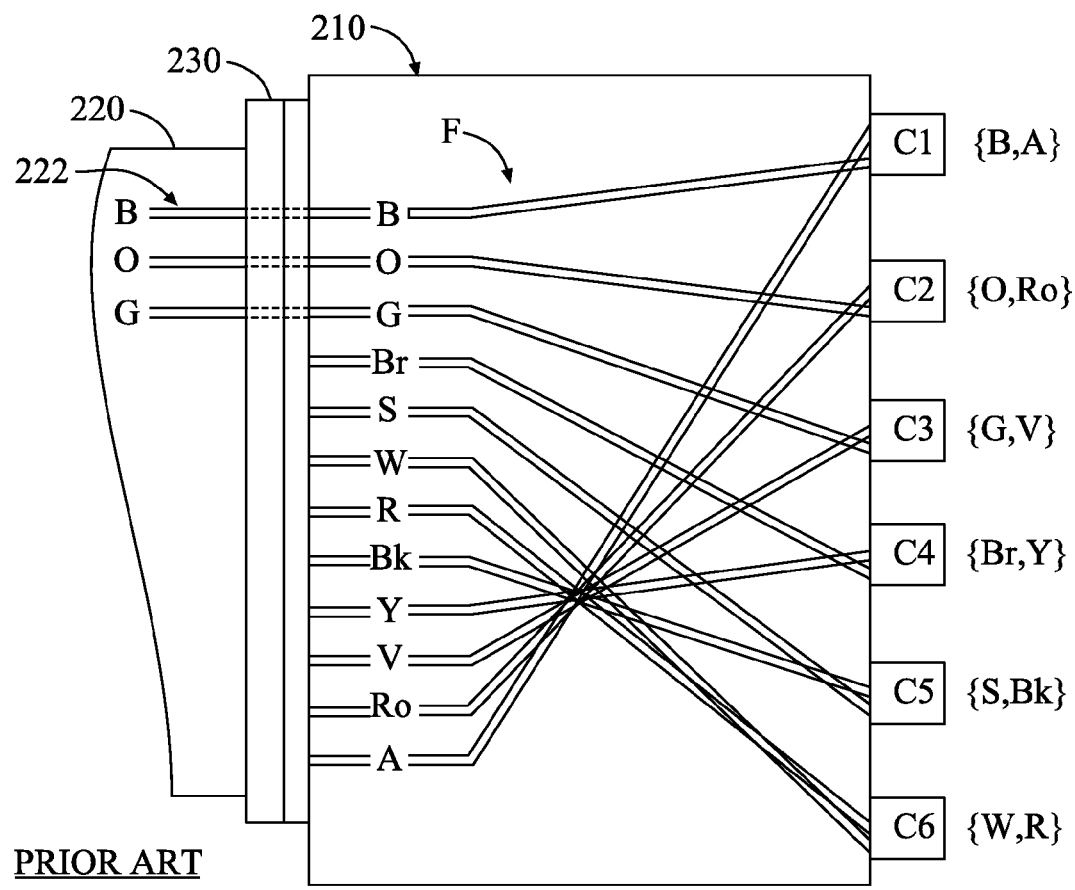
FIG. 4 is a close-up detailed schematic diagram of a prior art first optical fiber interconnection module used the system of FIG. 3 and that connects six dual-fiber ports to respective fibers in a 12-fiber optical fiber "trunk" cable.

With reference to FIG. 4, first interconnection module 210 includes a number of harness fibers F having a different configuration than that of 3x8f↔12f device 100. In an example embodiment, connectors C1 through C6 each have two ports associated with two harness fibers F and have a respective color configuration of {B, A}, {O, Ro}, {G, V}, {Br, Y}, {S, Bk} and {W, R}. First interconnect module 210 serves to interconnect connectors C1 through C6 to the corresponding (i.e., same-colored) fibers 222 in trunk cable 220. Connectors C1 through C6 may be, for example, connectors that connect to a six-port electronics device 216 (e.g., a line card) having dual-fiber connectors CA through CF (e.g., on a patch panel or adapter panel), where each connector C1-C6 is connected to two fibers, one for transmitting (T) and one for receiving (R). Likewise, connectors C1' through C8' at the other end of system 200 may be, for example, connectors that connect to an eight-port electronics device 280 having single-fiber connectors CA' through CH' (e.g., on a patch panel or adapter panel) with each connector being connected to a single fiber 270. Connectors C1 through C6 and connectors C1' through C8' typically provide connections to electronic devices such as line cards, servers, storage devices, etc.

Note that in the example embodiment, the color configuration at ports $1P_8(j)$ of {B, A, O, Ro, G, V, Br, Y} is similar to first four fiber color pairings at connectors C1-C6, namely: {B,A}, {O, Ro}, {G, V}, {Br, Y}. Note also that for a polarity of {T, R}, {T,R} ... {T, R} for connectors C1-C6, the polarity at connectors C1'-C8' has the sequence {T}, {R}, {T}, {R} ... {T},{R}—i.e., the polarity between the ends of system 200 is preserved.

The 3x8f↔12f devices 100, and systems 200 that utilize one or more 3x8f↔12f devices 100 are thus suitable for use for optically interconnecting assemblies in a network, for example, a LAN or a SAN. Multiple spans of assemblies can also be interconnected. Fiber flips in the trunk assembly just prior to one end of the MTP connector, for polarity correction, is not necessary, resulting in a complexity/cost reduction.

Figure 5:
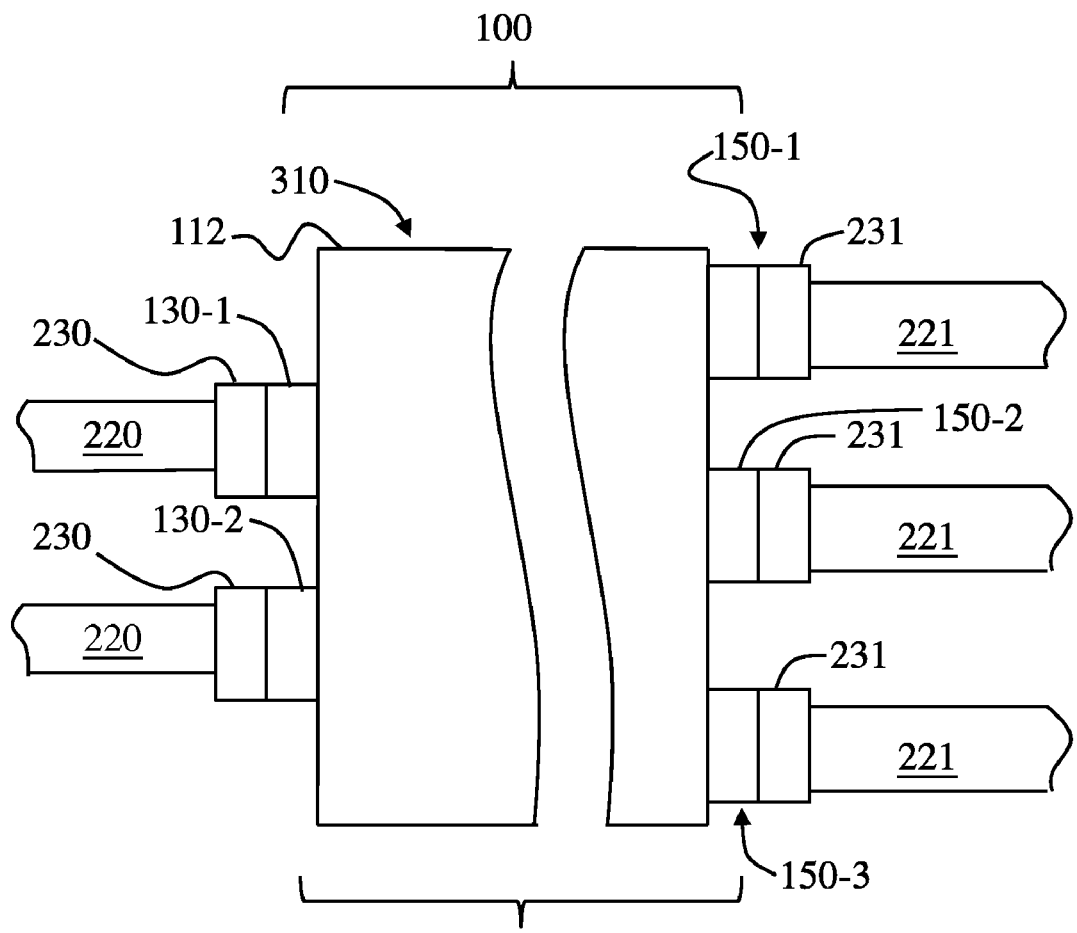
FIG. 5 is a schematic diagram of an example embodiment of the 3x8f↔12f device that includes an enclosure comprising a jacketed cable.

FIG. 5 illustrates an example embodiment of 3x8f↔12f device 100 wherein interconnection unit 110 is in the form of or is otherwise defined by a jacketed cable 310 that contains harness fibers F. In an example embodiment, the at least one wall 112 of interconnection unit 110 can be a single wall formed by circular-cross-section jacketed cable 310. This allows 3x8f↔12f device 100 to be used more like a cable, such as a jumper cable, as opposed to a rectangular, box-like module that could easily slide into an electronics shelf, connector housing, or like structure. In other example embodiments, jacketed cable 310 has a polygonal (e.g., rectangular) cross-section.

Figure 6:
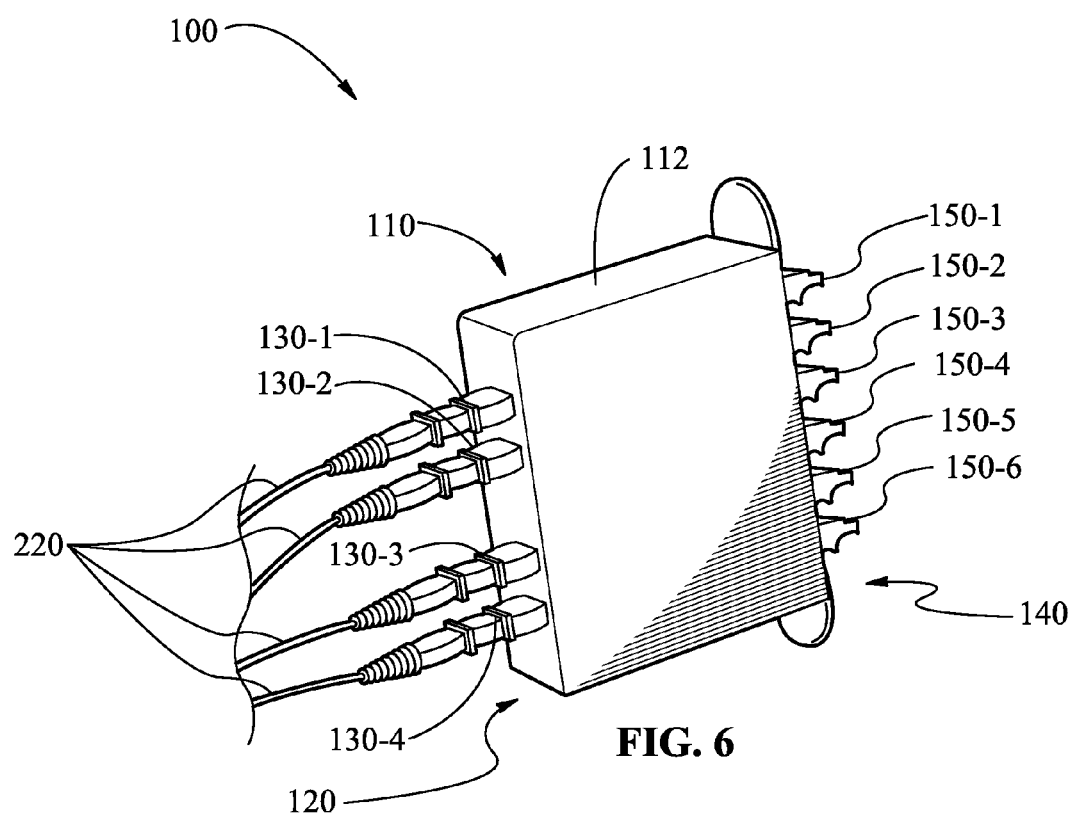
FIG. 6 is a perspective view of an example embodiment of the 3x8f↔12f device in the modular form of FIG. 1 having an enclosure and four 12-fiber connectors on one side of the enclosure and six 8-fiber connectors on the opposite side of the enclosure.

FIG. 6 is a perspective view of an example embodiment of 3x8f↔12f device 100 that is configured to handle four 12f fiber optic cables 220 as shown at respective four 12f connectors 130-1, 130-2, 130-3 and 130-4 at side 120. Note that there are now six 8f connectors 150-1 through 150-6 on side 140. The 3x8f↔12f device 100 of FIG. 5 accommodates a total of 48 fibers, i.e., has (4×12=) 48 total ports $P_{12}(i)$ and (6×8=) 48 total ports $P_8(j)$ for j=1 to 12. In 3x8f↔12f device 100 of FIG. 6, the number (i.e., the multiple) of sets of connectors is n=2.

As discussed above, in an example embodiment, connectors 130 and 150 can all be 12f connectors, with connectors 130 have dummy fibers placed in the unused ports $P_8(j)$—for example, the two ports at either end of the connector, i.e., $P_8(1)$, $P_8(2)$ and $P_8(11)$ and $P_8(12)$. The embodiment of 3x8f↔12f device 100 of FIG. 6 has a rectangular cross-section enclosure (module) 110 that allows the module to be easily installed into an electronics shelf, connector housing, or like structure.

As set out above, 3x8f↔12f device 100 includes optical fiber connector arrays, and n multiples thereof, for example, 150-1, 150-2, 150-3, 130-1, and 130-2, and optical fibers optically interconnecting at least some of the optical fiber connectors. More specifically, optical fiber connector arrays 130-1 and 130-2 respectively can include at least six ports each with arrays of optical fibers respectively extending therefrom. In addition, the first, second and third optical fiber connector arrays 150-1, 150-2, and 150-3 can respectively have at least four ports each. In an exemplary embodiment, connector array 150-1 receives at least two optical fibers from the first at least six-port optical fiber connector array 130-1, and the second at least four-port connector array 150-2 receives at least two optical fibers from the first at least six-port optical fiber connector array 130-1 and receives at least two optical fibers from the second at least six-port optical fiber connector array 130-2, and the third at least four-port optical fiber connector array 150-3 receiving at least two optical fibers from the second at least six-port optical fiber connector array 130-2. The first and second at least six-port optical fiber connector arrays 130-1 and 130-2 respectively can include more connector ports, for example, at least twelve ports each as shown in FIGS. 1 and 2A and described herein. The first, second, and third at least four-port optical fiber connector arrays 150-1, 150-2, and 150-3 can include more connector ports, for example, at least eight ports each as shown in FIGS. 1 and 2A as described herein. In addition, not all ports need be used. For example, one of the connector arrays 130 and 150 can include unused connectors.

The 3x8f↔24f Device

The description of the 3x8f↔24f device parallels that of the 3x8f↔12f device 100, and so the same reference numbers and symbols are used for the sake of convenience and consistency. In certain cases, primes are used to denote the difference between a 12f component and a 24f component. Because of the similarities between the 3x8f↔12f and 3x8f↔24f devices, only the essential differences are emphasized in the discussion below.

Figure 7:
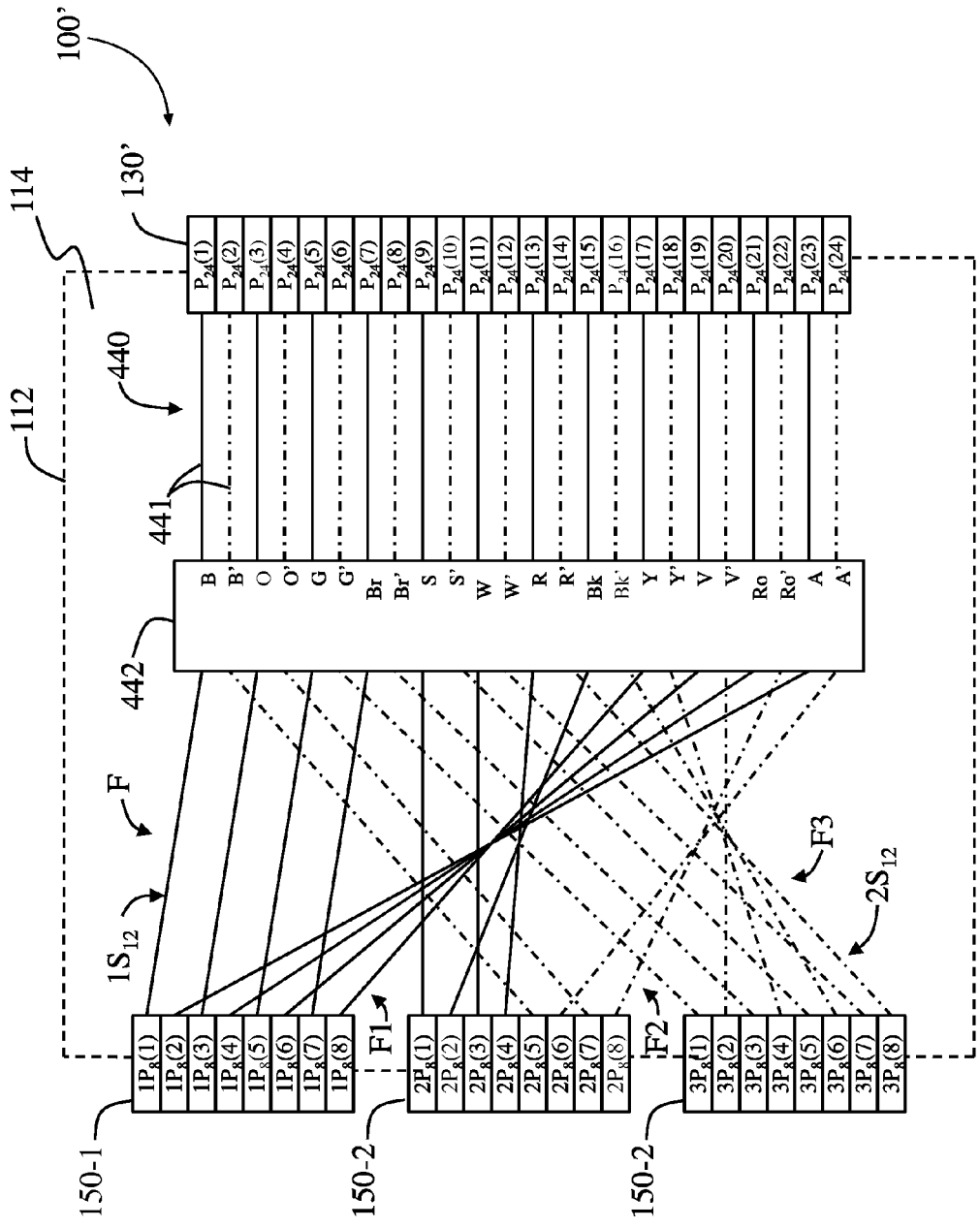
FIG. 7 is a schematic diagram similar to FIG. 1 and shows an example embodiment of an 3x8f↔24f optical fiber interconnection device ("3x8f↔24f device"), wherein optical fiber ("harness") wiring connects one 24-fiber connector with three 8-fiber connectors in a configuration that maintains fiber polarization.

FIG. 7 is a schematic diagram similar to FIG. 1 and shows an example embodiment of a 3x8f↔24f device 100' according to the present invention. FIG. 7 illustrates the polarization-maintaining wiring configuration for the 3x8f↔24f device 100'. The 3x8f↔24f device 100' of FIG. 7 optionally includes walls 112 that define an interior 114 and, in an example embodiment, a modular unit.

The 24f connector 130' has ports $P_{24}(i)$, where the subscript "24" denotes the total number of ports and i=1, 2, 3 ... 24, where i indicates the $i^{th}$ port. The connector ports $P_{24}$ of 24f connector 130' are optically connected to select connector ports $P_8$ of 8f connectors 150 using the aforementioned color-coded array of harness fibers F, the particular "wiring" configuration of which is discussed below. For convenience, harness fibers F are broken down into three groups F1, F2 and F3 respectively associated with fibers connected to connector ports 1P8, 2P8 and 3P8 of 8f connectors 150-1, 150-2 and 150-3.

3x8f↔24f Wiring Configuration

With continuing reference to FIG. 7, two sets of twelve harness fibers F denoted by the above-mentioned colors (and differentiated by unprimed and primed notation as per above) interconnect select ports $P_{24}(i)$ to select ports $1P_8(j)$, $2P_8(j)$ and $3P_8(j)$ as shown. The configuration of port interconnections is summarized in the following Tables 4 through 6:

TABLE 4

Wiring @ Connector 150-1

| Port $1P_8(j)$ | Port $P_{24}(i)$ | Color |
| --- | --- | --- |
| $1P_8(1)$ | $P_{24}(1)$ | B |
| $1P_8(2)$ | $P_{24}(23)$ | A |
| $1P_8(3)$ | $P_{24}(3)$ | O |
| $1P_8(4)$ | $P_{24}(21)$ | Ro |
| $1P_8(5)$ | $P_{24}(5)$ | G |
| $1P_8(6)$ | $P_{24}(19)$ | V |
| $1P_8(7)$ | $P_{24}(7)$ | Br |
| $1P_8(8)$ | $P_{24}(17)$ | Y |

TABLE 5

Wiring @ Connector 150-2

| Port $2P_8(j)$ | Port $P_{24}(i)$ | Color |
| --- | --- | --- |
| $2P_8(1)$ | $P_{24}(9)$ | S |
| $2P_8(2)$ | $P_{24}(15)$ | Bk |
| $2P_8(3)$ | $P_{24}(11)$ | W |
| $2P_8(4)$ | $P_{24}(13)$ | R |
| $2P_8(5)$ | $P_{24}(2)$ | B' |
| $2P_8(6)$ | $P_{12}(24)$ | A' |
| $2P_8(7)$ | $P_{12}(4)$ | O' |
| $2P_8(8)$ | $P_{12}(22)$ | Ro' |

TABLE 6

Wiring @ Connector 150-3

| Port $3P_8(j)$ | Port $P_{24}(i)$ | Color |
|---|---|---|
| $3P_8(1)$ | $P_{24}(6)$ | G' |
| $3P_8(2)$ | $P_{24}(20)$ | V' |
| $3P_8(3)$ | $P_{24}(8)$ | Br' |
| $3P_8(4)$ | $P_{24}(18)$ | Y' |
| $3P_8(5)$ | $P_{24}(10)$ | S' |
| $3P_8(6)$ | $P_{24}(16)$ | Bk' |
| $3P_8(7)$ | $P_{24}(12)$ | W' |
| $3P_8(8)$ | $P_{24}(14)$ | R' |

The interconnection configuration between ports $P_{24}$ and $P_8$ of connectors 130' and 150 can be described as follows, for j=1 to 8:

i. $\{1P_8(j)\} \leftrightarrow \{P_{24}(1), P_{24}(23), P_{24}(3), P_{24}(21), P_{24}(5), P_{24}(19), P_{24}(7), P_{24}(17)\}$;

ii. $\{2P_8(j)\} \leftrightarrow \{P_{24}(9), P_{24}(15), P_{24}(11), P_{24}(13), P_{24}(2), P_{24}(24), P_{24}(4), P_{24}(22)\}$; and iii. $\{3P_8(j)\} \leftrightarrow \{P_{24}(6), P_{24}(20), P_{24}(8), P_{24}(18), P_{24}(10), P_{24}(16), P_{24}(12), P_{24}(14)\}$.

The mapping of harness fibers F between ports $P_{24}$ and $P_8$ of respective connectors 130' and 150 can also be described in terms of the aforementioned color-coding scheme, where $P_{24}(i)$ (for i=1 through 23, odd) corresponds to a first (unprimed) set $S_{12}$ of colored fibers $1S_{12}=\{B, O, G, Br, S, W, R, Bk, Y, V, Ro, A\}$ and $P_{24}(i)$ (for i=2 through 24, even) corresponds to a second (primed) set $2S_{12}=\{B', O', G', Br', S', W', R', Bk', Y', V', Ro', A'\}$.

The corresponding colored-fiber sets $S_8$ for ports $1P8(j)$ and $2P8(j)$ and $3P_8(j)$ (for j=1 through 8) of respective connectors 150-1, 150-2 and 150-3 are as follows: $1S_8=\{B, A, O, Ro, G, V, Br, Y\}$; $2S_8=\{S, Bk, W, R, B', A', O', Ro'\}$, and $3S_8=\{G', V', Br', Y', S', Bk', W', R'\}$. Thus, 3x8f↔24f device 100' can be said to "map" the colored fiber sets $1S_{12}$ and $2S_{12}$ associated with ports $P_{24}$ of 24f connector 130' to the colored fiber sets $1S_8$, $2S_8$ and $3S_8$ associated with ports $1P_8$, $2P_8$ and $3P_8$ of 8f connectors 150-1, 150-2 and 150-3. The 3x8f↔24f device 100' also preserves polarity between connectors 130 and 150-1, 150-2 and 150-3 in a similar manner as described above in connection with the 3x8f↔12f device, wherein each connector 130 and 150 has the same number of transmit T ports as receive R ports. The 3x8f↔24f device 100' thus provides polarization-preserving parallel optics solutions for performing the interconnections {n x24f}↔{(3n)x8f}. Like the 3x8f↔12f device 100, the 3x8f↔12f device 100' does not require a module or housing (e.g., such as formed by walls 112).

Figures 8A, 8B:
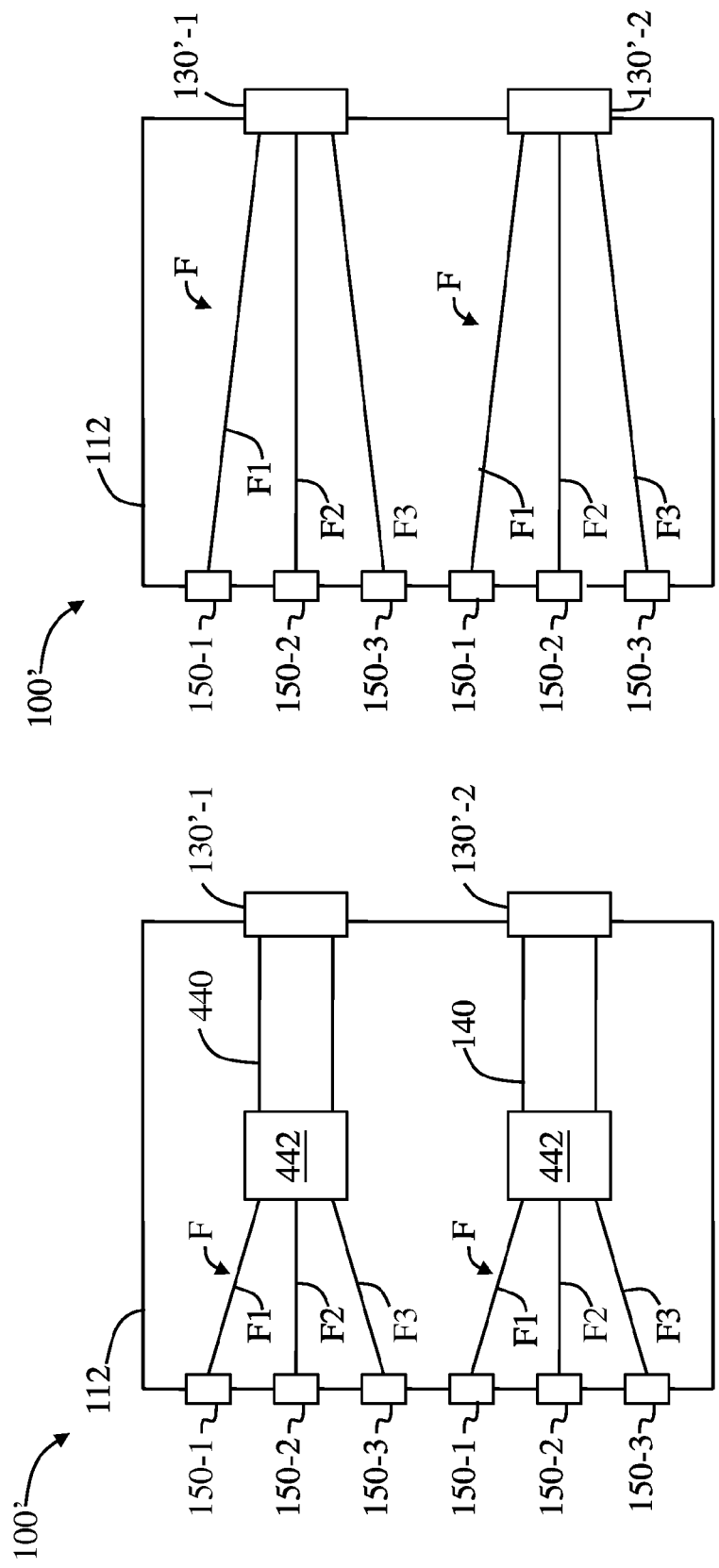
FIG. 8A and FIG. 8B illustrate example embodiments of the 3x8f↔24f device that includes two 1x24f connectors and two sets of 3x8f connectors.

FIG. 8A and FIG. 8B illustrate example embodiments of 3x8f↔24f device 100' that include two 1x24f connectors 130' (i.e., connectors 130'-1 and 130'-2) and two sets of 3x8f connectors 150. In an example embodiment of 3x8f↔24f device 100' as shown in FIG. 7 and FIG. 8A, a section of 24f fiber optic cable (e.g., a ribbon) 440 with fibers 441, and a fiber-arranging unit 442 at one end are used to connect harness fibers F to 24f connector 130'. Fiber-arranging unit 442 is configured to connect harness fibers F to fibers 441 of 24f fiber cable 440. In an example embodiment, fiber arranging unit 442 includes a splice tray where the various fibers are spliced and supported in a protected manner. FIG. 8B illustrates an example embodiment of 3x8f↔24f device 100' where harness fibers F are connected directly to 24f connector 130.

Figure 9:
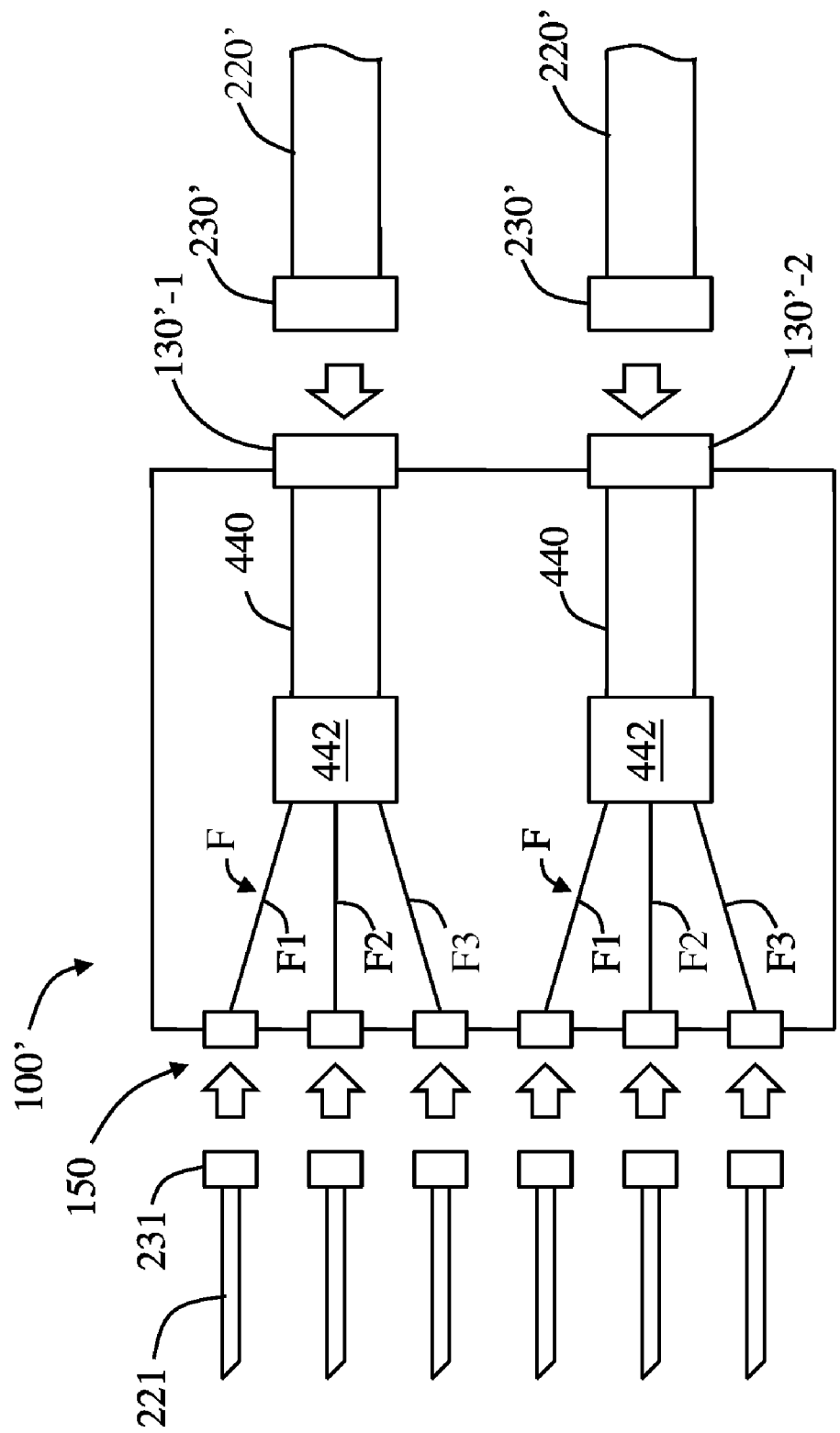
FIG. 9 is a schematic diagram that shows how the 3x8f↔24f device shown in FIG. 8A connects to 8f and 24f trunk cables.

FIG. 9 is a schematic diagram that shows how 3x8f↔24f device 100' shown in FIG. 8A connects to devices in the form of two 24f trunk cables 220' each having the exemplary 24f connector 230', and six 8f trunk cables 221' each having an 8f connector 231'.

3x8f↔24f Optical Interconnection System

Figure 10:
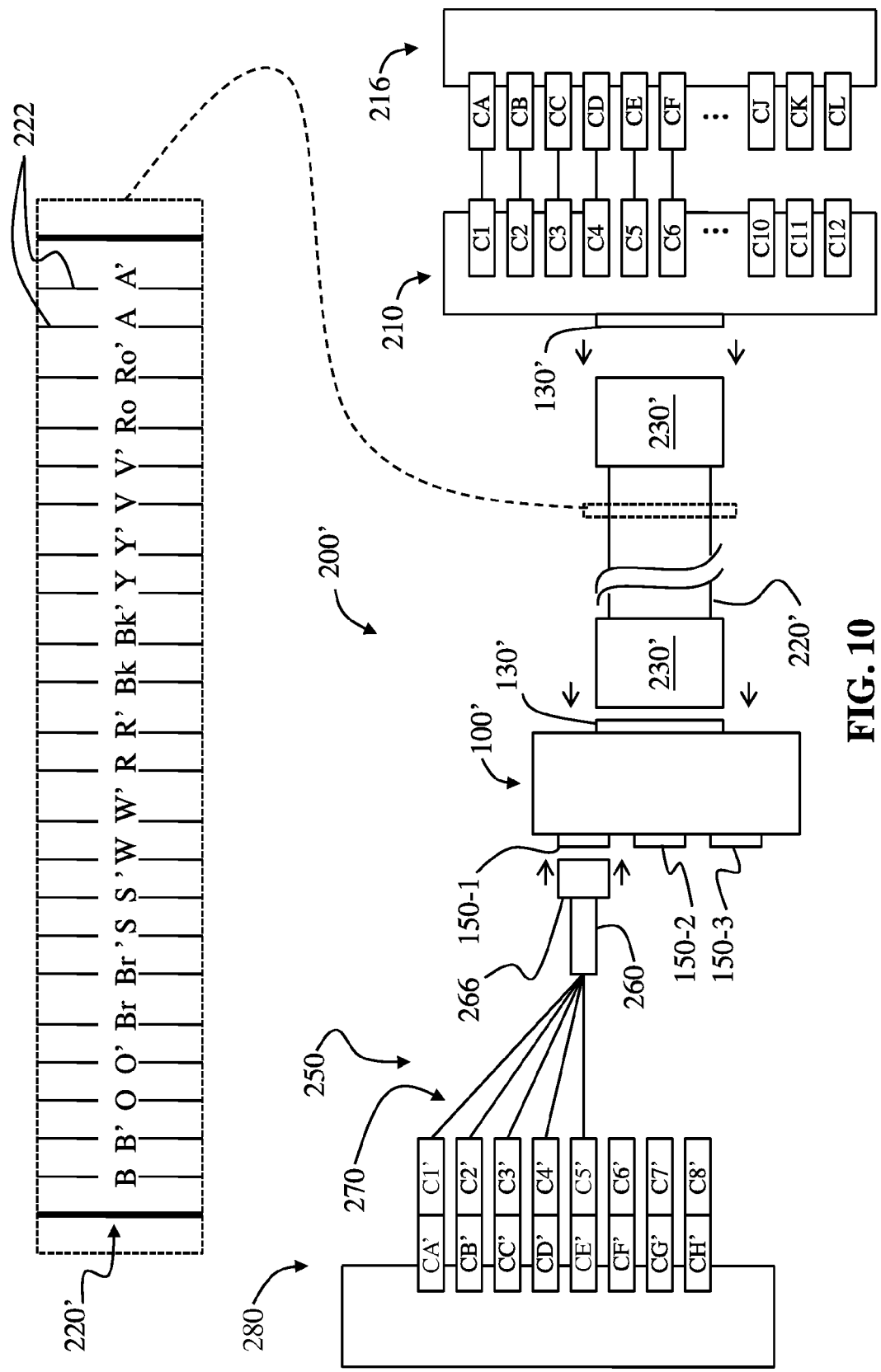
FIG. 10 is a schematic diagram similar to FIG. 3 and shows an example embodiment of an optical interconnection system that utilizes the 3x8f↔24f device.

FIG. 10 is a schematic diagram similar to FIG. 3 and shows an example embodiment of an optical interconnection system 200' that utilizes 3x8f↔24f device 100'. System 200' may be used, for example, as part of an optical network, such as a LAN or a SAN at an optical telecommunications data center.

System 200' includes a first optical fiber interconnection module 210 shown in more detail in FIG. 4 and as discussed above. First interconnection module 210 is optically connected to "universal trunk" fiber optic cable 220' that carries cable fibers 222'. Cable 220' is terminated at both ends with one or more 24f connectors 230'. In an example embodiment, connectors 230' are MTP connectors. In one example embodiment, cable 220' has 72 fibers 222' and three 24f MTP connectors 230' at each end, while in another example embodiment, the cable has 24 fibers and a single 24f MTP connector 230' at each end, as shown. Other arrangements with suitable multiples of connectors are also envisioned. The inset in FIG. 10 shows an example embodiment of a 24f trunk cable 220' along with example color designations for cable fibers 222'. Trunk cable 220' is connected to 3x8f↔24f device 100' via trunk cable connector 230' mating with module connector 130'.

System 200' includes a fiber harness 250 having a fiber optic cable 260 that includes at one end an 8f connector 266 and at the other end eight separate single-fiber connectors C1' through C8' respectively connected to the eight fiber optical fibers 270 carried in cable 260. The eight fibers 270 in cable 260 are connected via connector 266 to device 100' at connector 150-1 and thus correspond to ports $1P_8(1)$ through $1P_8(8)$ having associated therewith the respective colors {B, A, O, Ro, G, V, Br, Y}.

First interconnection module 210 is similar to that shown in FIG. 4 and includes a number of harness fibers F having a different configuration than that of 3x8f↔24f device 100'. In an example embodiment, connectors C1 through C12 each have two ports associated with two harness fibers F and have a respective color configuration of {B, B'}, {O, O'}, {G'G'}, {Br, Br'}, etc. First interconnect module 210 serves to interconnect connectors C1 through C12 to the corresponding (i.e., same-colored) fibers 222' in trunk cable 220'. Connectors C1 through C12 may be, for example, connectors that connect to a twelve-port electronics device 216 (e.g., a line card) having dual-fiber connectors CA through CL (e.g., on a patch panel or adapter panel), where each connector C1-C12 is connected to two fibers, one for transmitting (T) and one for receiving (R). Likewise, connectors C1' through C8' at the other end of system 200 may be, for example, connectors that connect to an eight-port electronics device 280 having single-fiber connectors CA' through CH' (e.g., on a patch panel or adapter panel) with each connector being connected to a single fiber 270. Connectors C1 through C12 and connectors C1' through C8' typically provide connections to electronic devices such as line cards, servers, storage devices, etc.

The 3x8f↔24f devices 100' and systems 200' that utilize one or more devices 100' are thus suitable for use for optically interconnecting assemblies in a network, for example, a LAN or a SAN. Multiple spans of assemblies can also be interconnected. Fiber flips in the trunk assembly just prior to one end of the MTP connector, for polarity correction, is not necessary, resulting in a complexity/cost reduction.

Figure 11:
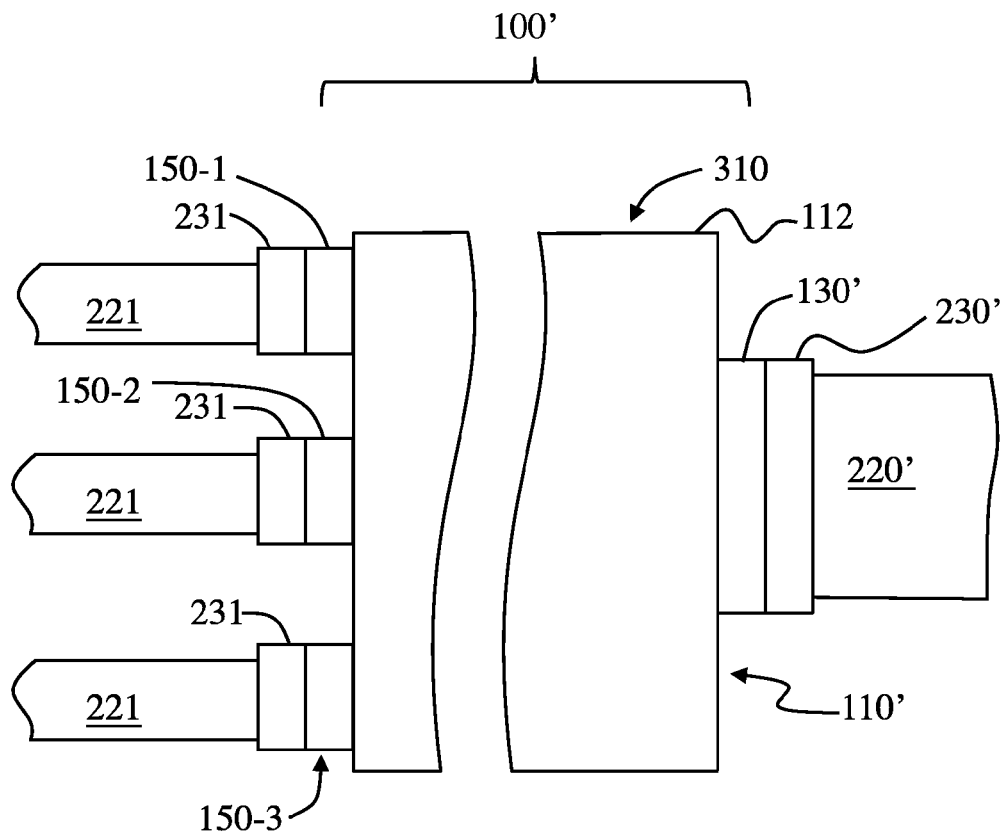
FIG. 11 is a schematic diagram of an example embodiment of the 3x8f↔24f device that includes an enclosure comprising a jacketed cable.

FIG. 11 illustrates an example embodiment of 3x8f↔24f device 100', wherein interconnection unit 110' is in the form of or is otherwise defined by a jacketed cable 310 that contains harness fibers F. In an example embodiment, the at least one wall 112 of interconnection unit 110' can be a single wall formed by circular-cross-section jacketed cable 310. This allows 3x8f↔24f device 100' to be used more like a cable, such as a jumper cable, as opposed to a rectangular, box-like module that could easily slide into an electronics shelf, connector housing, or like structure. In other example embodiments, jacketed cable 310 has a polygonal (e.g., rectangular) cross-section.

Figure 12:
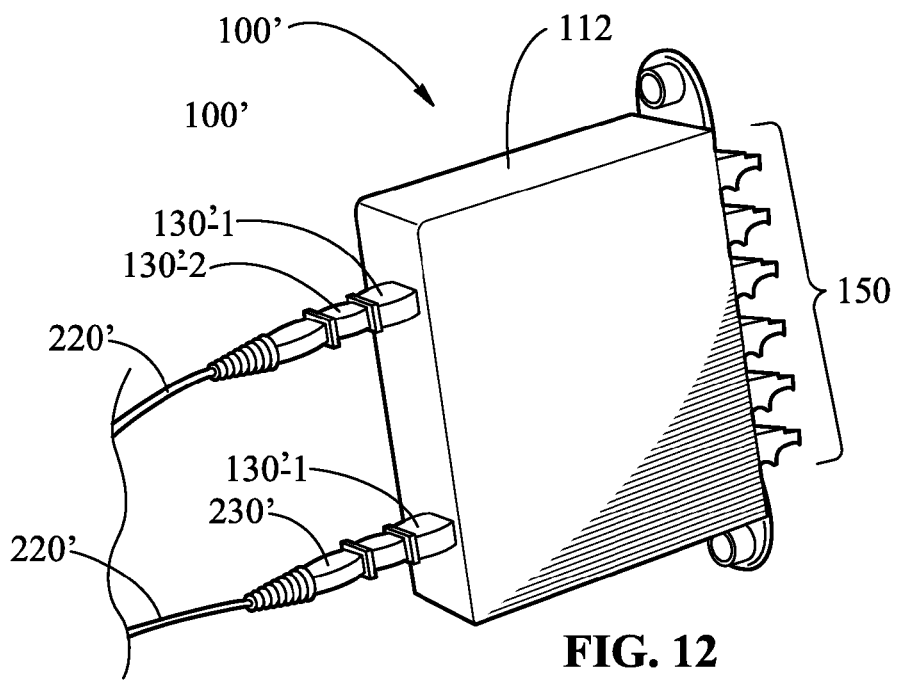
FIG. 12 is a perspective view of an example embodiment of the 3x8f↔12f device in the modular form of FIG. 6 but with two 24-fiber connectors on one side of the enclosure and six 8f connectors on the opposite side of the enclosure.

FIG. 12 is similar to FIG. 6 and is a perspective view of an example embodiment of 3x8f↔24f device 100' configured to handle two 24f fiber optic cables 220' at respective two 24f connectors 130'-1 and 130'-2 at side 120. Note that there are six 8f connectors 150-1 through 150-6 on side 140. The 3x8f↔24f device 100' of FIG. 12 accommodates a total of 48 fibers, i.e., has (2×24=) 48 total ports $P_{24}(i)$ and (6×8=) 48 total ports $P_8(j)$. In 3x8f↔24f device 100' of FIG. 12, the number n (i.e., the multiple) of sets of connectors is n=2. It is noted that an example embodiment of 3x8f↔24f device 100' of FIG. 12 has the same form factor (i.e., same footprint) as the 3x8f↔24f of FIG. 6.

As discussed above, in an example embodiment, connectors 150 can all be 12f connectors, with 8f connectors 150 having dummy fibers placed in the unused ports $P_8(j)$—for example, the two ports at either end of the connector, i.e., $P_8(1)$, $P_8(2)$ and $P_8(11)$ and $P_8(12)$. The embodiment of 3x8f↔24f device 100' of FIG. 12 has a rectangular cross-section that allows the device to be easily installed into an electronics shelf, connector housing, or like structure.

As set out above, 3x8f↔24f device 100' includes optical fiber connector arrays, and n multiples thereof, for example, 150-1, 150-2, 150-3, and 130', and optical fibers optically interconnecting at least some of the optical fiber connectors. More specifically, optical fiber connector 130' includes 24 ports with optical fibers respectively extending therefrom. In addition, the first, second and third optical fiber connector arrays 150-1, 150-2, and 150-3 can respectively have at least four ports each that respectively receive two optical fibers from 24f connector 130'. The first, second, and third at least four-port optical fiber connector arrays 150-1, 150-2, and 150-3 can include more connector ports, for example, at least eight ports each. In addition, not all ports need be used. For example, one of the connector arrays 130 and 150 can include unused connectors. In addition, 24-port connector 130' can be formed form two 12-port connectors 130.

Figure 13:
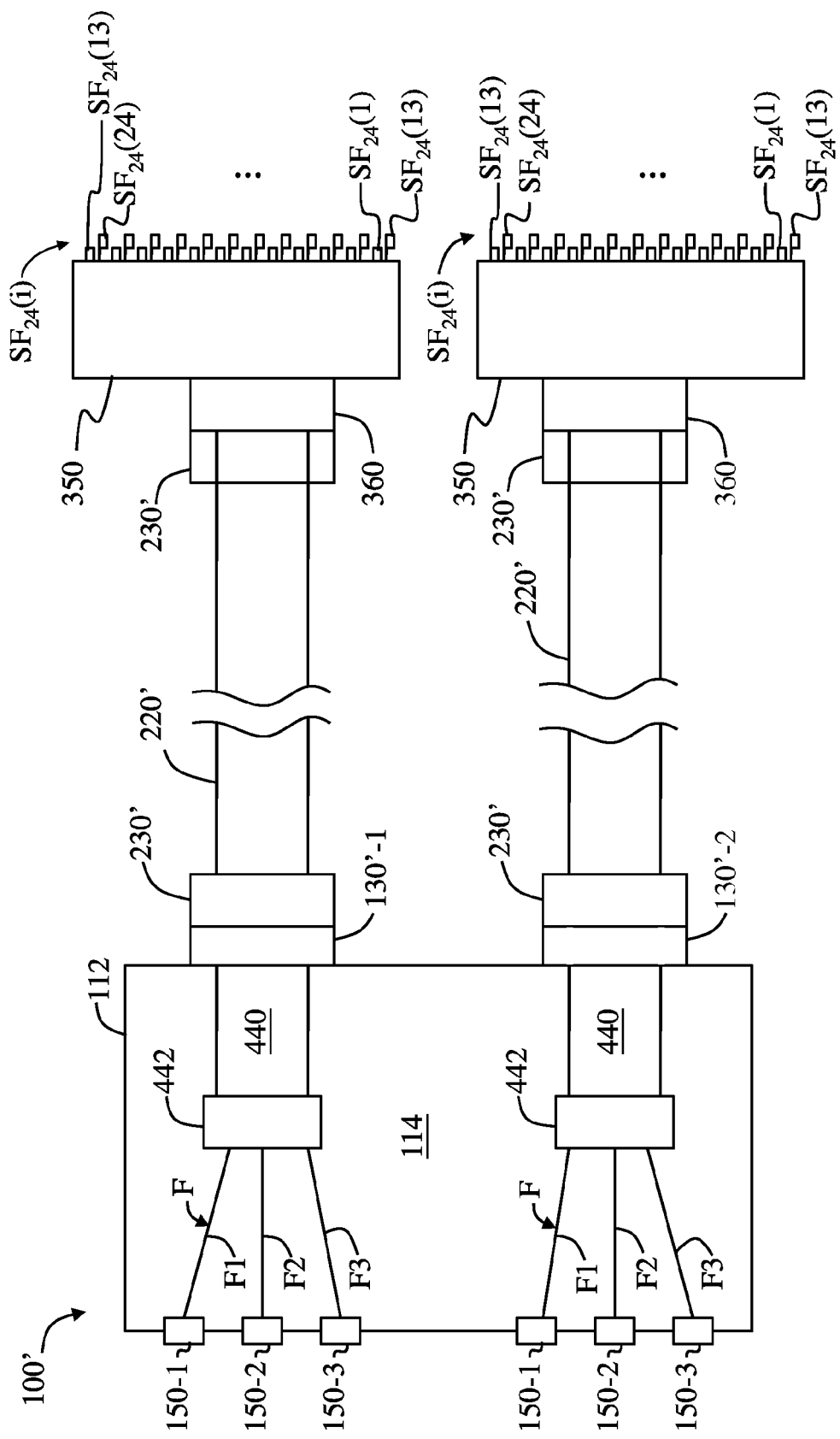
FIG. 13 is a schematic diagram of an arrangement that includes the 3x8f↔24f device of FIG. 8A connected via two 24f trunk cables to respective 24f universal modules 350 each having 24 single-fiber ports $SF_{24}(i)$.
Figure 14:
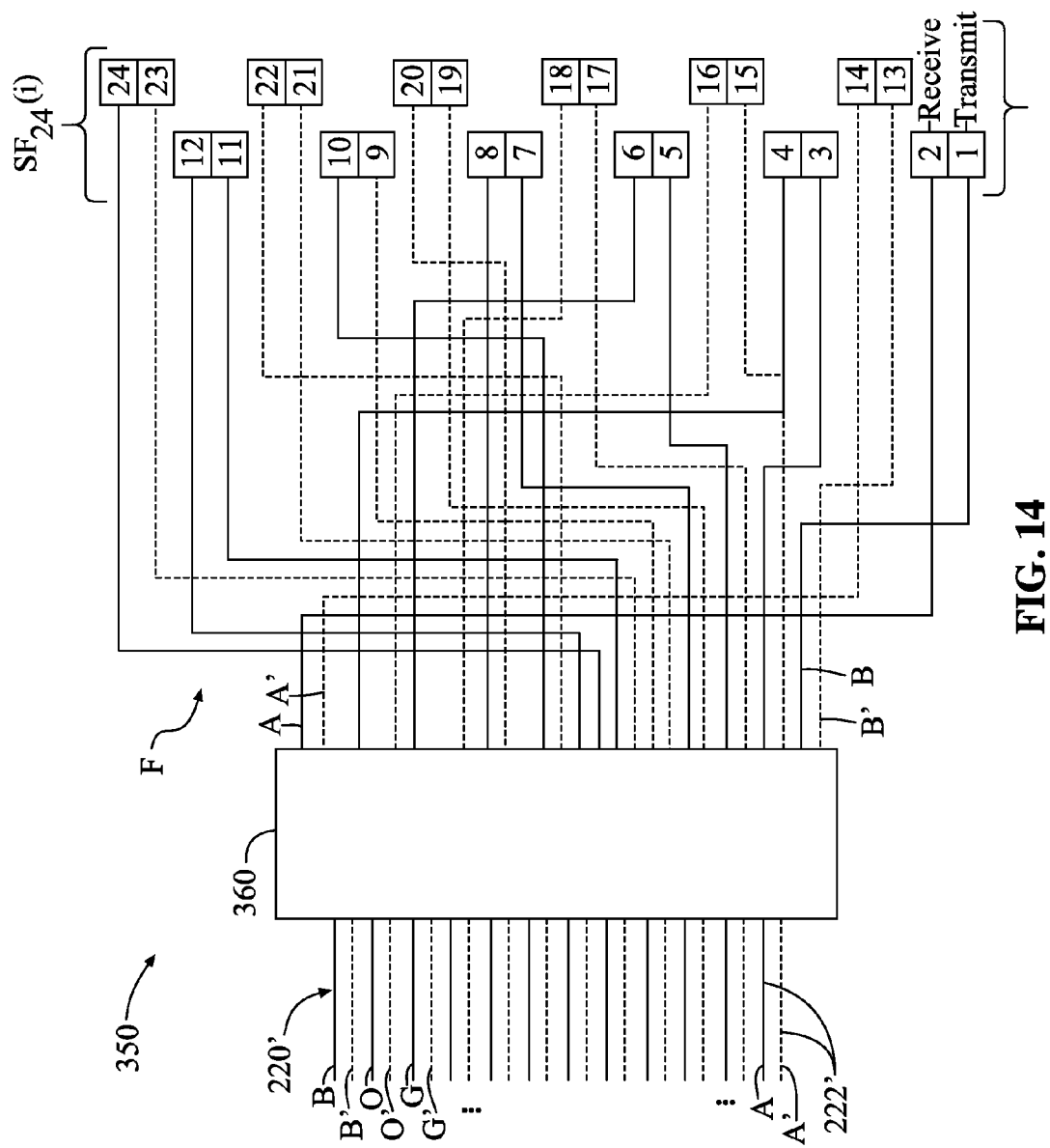
FIG. 14 is a close-up schematic view of an example 24f universal module of FIG. 13 and shows the optical fiber "wiring" configuration of the harness fibers that connects the trunk cable to the single-fiber ports $SF_{24}(i)$.

FIG. 13 is a schematic diagram of an arrangement where the 3x8f↔24f device 100' of FIG. 8A is connected via two 24f trunk cables 220' to respective 24f universal modules 350 each having 24 single-fiber ports $SF_{24}(i)$ (for i=1 through 24). Modules 350 each include a 24f connector 360, such as an MTP-type connector, that connects the module to the corresponding 24f trunk cable 220'. FIG. 14 is a close-up schematic view of an example 24f universal module of FIG. 13 and shows the optical fiber "wiring" configuration of the harness fibers F that connects the trunk cable to the single-fiber ports $SF_{24}(i)$.

Figure 15:
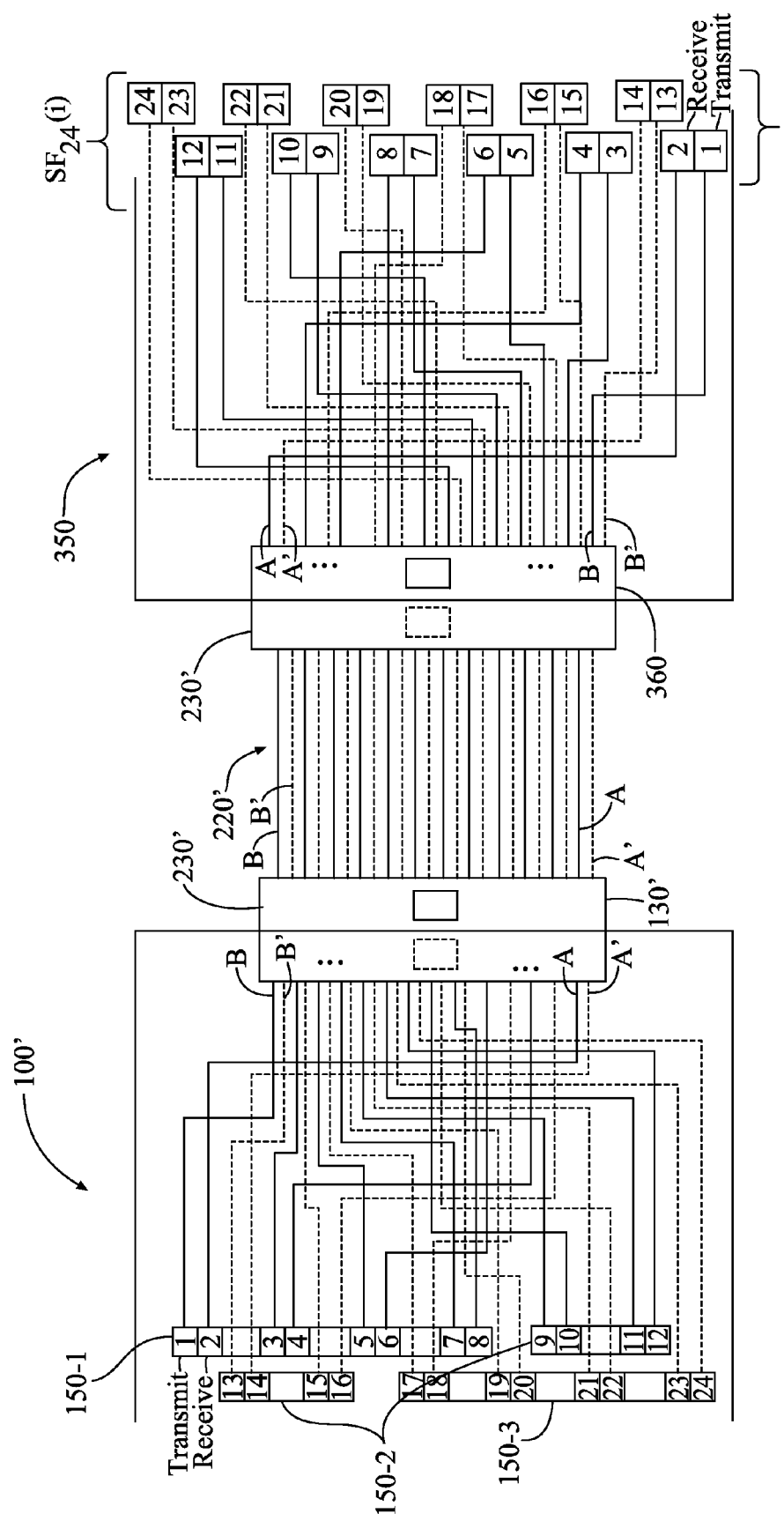
FIG. 15 is a more detailed view of an example embodiment of the arrangement shown in FIG. 13, wherein connector arrays of the 3x8f↔24f device are shown in an alternate schematic configuration to better illustrate the end-to-end port connections with single-fiber ports $SF_{24}(i)$.

FIG. 15 is a more detailed view of an example embodiment of the arrangement shown in FIG. 13, wherein connector arrays 150-1, 150-2 and 150-3 of 3x8f↔24f device 100' are shown in an alternate schematic configuration where ports $1P_8(j)$, $2P_8(j)$ and $3P_8(j)$ (j=1 through 8) are re-labeled as ports $P_8(i)$ for i=1 through 24 to better illustrate the polarity-preserving end-to-end port connections with single-fiber ports $SF_{24}(i)$. With reference to FIG. 15, the 3x8f↔24f device 100' connects single ports $P_8(i)$ to single ports $SF_{24}(i)$ via the following configuration:

i) $\{P_8(i)\} \leftrightarrow \{SF_{24}(i+1))\}$ for i=1 to 23 ODD
ii) $\{P_8(i)\} \leftrightarrow \{SF_{24}(i-1)\}$ for i=2 to 24 EVEN This configuration establishes a polarization-preserving connection between the ports $P_8$ of the three eight-port connectors 150 and the ports $SF_{24}$ of the single-fiber connectors.

Figure 16:
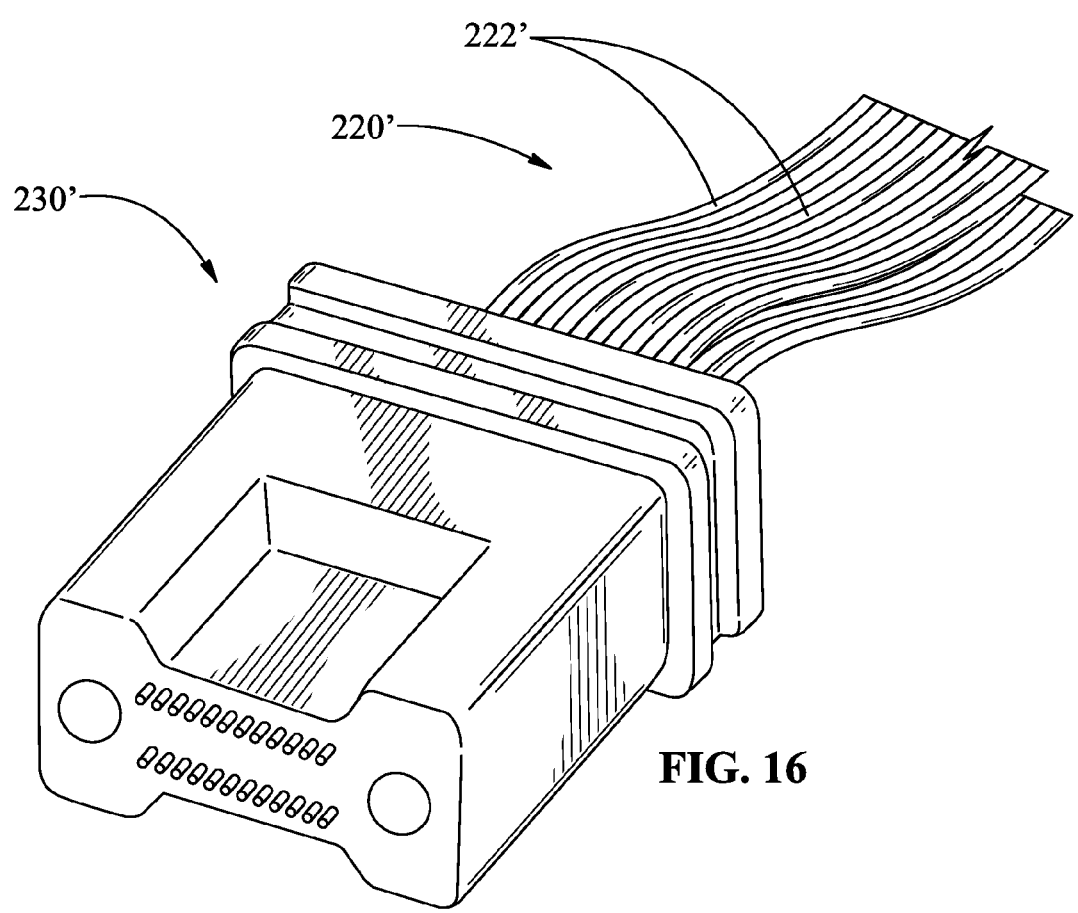
FIG. 16 is a perspective view of an example 24f MTF-type connector at one end of a 24f ribbon-type fiber optic cable.

FIG. 16 is a perspective view of an example 24f MTF-type connector 230' at one end of a ribbon-type 24f trunk cable 220'.

The specification invention has been described with reference to the foregoing embodiments, which embodiments are intended to be illustrative of the present inventive concepts rather than limiting. Persons of ordinary skill in the art will appreciate that variations and modifications of the foregoing embodiments may be made without departing from the scope of the appended claims.

What is claimed is:

1. An optical fiber interconnection device, comprising:
   a twenty-four-port connector having ports $P_{24}(i)$ for i=1 to 24, wherein ports i=1 to i=12 are located in a first row of the twenty-four-port connector and ports i=13 to i=24 are located in second row of the twenty-four-port connector;
   first, second and third eight-port connectors respectively having ports $1P_8(j)$, ports $2P_8(j)$ and ports $3P_8(j)$ for j=1 to 8; and
   an array of optical fibers configured to connect the ports as follows for j=1 to 8 (where $\{a1, b1 \ldots\} \leftrightarrow \{a2, b2 \ldots\}$ denotes connecting a1 to a2, b1 to b2, etc):
   i) $\{1 P_8(j)\} \leftrightarrow \{P_{24}(1), P_{24}(23), P_{24}(3), P_{24}(21), P_{24}(5), P_{24}(19), P_{24}(7), P_{24}(17)\}$;
   ii) $\{2P_8(j)\} \leftrightarrow \{P_{24}(9), P_{24}(15), P_{24}(11), P_{24}(13), P_{24}(2), P_{24}(24), P_{24}(4), P_{24}(22)\}$; and
   iii) $\{3P_8(j))\} \leftrightarrow \{P_{24}(6), P_{24}(20), P_{24}(8), P_{24}(18), P_{24}(10), P_{24}(16), P_{24}(12), P_{24}(14)\}$.

2. The optical fiber interconnection device of claim 1, wherein at least one of the eight-port connectors has twelve ports, and wherein four of the twelve ports are not used.

3. The optical fiber interconnection device of claim 1, wherein the optical fibers include first and second sets of twelve color-coded fibers.

4. The optical fiber interconnection device of claim 1, further including a twenty-four-fiber fiber optic cable section having first and second ends respectively optically connected to the array of optical fibers and the twenty-four-port connector.

5. The optical fiber interconnection device of claim 4, wherein the fiber optic cable comprises an optical fiber ribbon.

6. The optical fiber interconnection device of claim 4, further comprising a fiber-arranging unit at the first end of the fiber optic cable section that connects the array of optical fibers to the twenty-four-port connector.

7. The optical fiber interconnection device of claim 1, wherein for n integer and n≧2, the device includes n sets of twenty-four port connectors and n sets of the three eight-port connectors.

8. The optical fiber interconnection device of claim 1, wherein the device includes:
   an enclosure that defines an interior region and that contains the array of optical fibers, and wherein the eight-port connectors and twenty-four port connector are connected to the enclosure.

9. The optical fiber interconnection device of claim 8, wherein the enclosure comprises a fiber cable jacket.

10. An optical fiber interconnection system, comprising:
the optical fiber interconnection device of claim 1; and
at least one twenty-four-fiber fiber optic cable connected to the device at the twenty-four-port connector.

11. The optical fiber interconnection system of claim 10, further comprising:
at least one twenty-four-fiber module having twenty-four single ports $SF_{24}(1)$ through $SF_{24}(24)$ and optically connected to the at least one twenty-four-fiber fiber optic cable so as to be optically connected to ports $1P_8(j)$, $2P_8(j)$ and $3P_8(j)$ in a polarization-preserving configuration.

12. The optical fiber interconnection system of claim 1, wherein the array of optical fibers comprises
at least a first set of twelve first optical fibers having color-code and optically connected to ports $P_{24}(j)$ for $j=1$ to 23 for odd numbered ports;
at least a second set of twelve second optical fibers having said color code and optically connected to ports $P_{24}(j)$ for $j=2$ to 24 for even numbered ports.

13. A method of optically interconnecting a twenty-four-port connector having ports $P_{24}(i)$ for $i=1$ to 24, to first, second and third eight-port connectors having respective ports $1P_8(j)$, $2P_8(j)$ and $3P_8(j)$ for $j=1$ to 8, the method comprising:
wherein ports $i=1$ to $i=12$ are located in a first row of the twenty-four-port connector and ports $i=13$ to $i=24$ are located in second row of the twenty-four-port connector; and
configuring an array of optical fibers to connect the ports as follows, (where $\{a1, b1 \ldots\} \leftrightarrow \{a2, b2 \ldots\}$ denotes a1 to a2; b1 to b2; etc):
i) $\{1P_8(j)\} \leftrightarrow \{P_{24}(1), P_{24}(23), P_{24}(3), P_{24}(21), P_{24}(5), P_{24}(19), P_{24}(7), P_{24}(17)\}$;
ii) $\{2P_8(j)\} \leftrightarrow \{P_{24}(9), P_{24}(15), P_{24}(11), P_{24}(13), P_{24}(2), P_{24}(24), P_{24}(4), P_{24}(22)\}$; and
iii) $\{3P_8(j)\} \leftrightarrow \{1P_{24}(6), P_{24}(20), P_{24}(8), P_{24}(18), P_{24}(10), P_{24}(16), P_{24}(12), P_{24}(14)\}$.

14. The method of claim 13, further comprising enclosing the array of optical fibers in an enclosure.

15. The method of claim 13, further comprising:
optically connecting the array of optical fibers and the twenty-four-port connector via a section of a twenty-four-fiber fiber optic cable.

16. The method of claim 13, further comprising for n integer and $n \geq 2$, providing n twenty-four-port connectors and n sets of the three eight-port connectors so as to repeat said port configuration n times.

17. The method of claim 13, further including:
optically connecting at least one twenty-four-fiber module having twenty-four single ports $SF_{24}(1)$ through $SF_{24}(24)$ to ports $1P_8(j)$, $2P_8(j)$ and $3P_8(j)$ in a polarization-preserving configuration.

18. An optical fiber interconnection device, comprising:
an enclosure defining an interior region;
at least one twenty-four-port connector operably connected to the enclosure and respectively having ports $P_{24}(i)$ for $i=1$ to 24, wherein ports $i=1$ to $i=12$ are located in a first row of the twenty-four-port connector and ports $i=13$ to $i=24$ are located in second row of the twenty-four-port connector;
at least one set of first, second and third eight-port connectors operably connected to the enclosure and respectively having ports $1P_8(j)$, $2P_8(j)$ and $3P_8(j)$ for $j=1$ to 8;
at least a first set of twelve first optical fibers having a color-code and contained within the interior region and optically connected to ports $P_{24}(i)$ for $i=1$ to 23 for odd numbered ports;
at least a second set of twelve second optical fibers having said color code and contained within the interior region and optically connected to ports $P_{24}(i)$ for $i=2$ to 24 for even numbered ports;
wherein the at least first and second sets of color-coded optical fibers are configured to connect the ports as follows, for $j=1$ to 8 (where $\{a1, b1 \ldots\} \leftrightarrow \{a2, b2 \ldots\}$ denotes connecting a1 to a2, b1 to b2, etc):
i) $\{1P_8(j)\} \leftrightarrow \{P_{24}(1), P_{24}(23), P_{24}(3), P_{24}(21), P_{24}(5), P_{24}(19), P_{24}(7), P_{24}(17)\}$;
ii) $\{2P_8(j)\} \leftrightarrow \{P_{24}(9), P_{24}(15), P_{24}(11), P_{24}(13), P_{24}(2), P_{24}(24), P_{24}(4), P_{24}(22)\}$; and
iii) $\{3P_8(j)\} \leftrightarrow \{P_{24}(6), P_{24}(20), P_{24}(8), P_{24}(18), P_{24}(10), P_{24}(16), P_{24}(12), P_{24}(14)\}$.

19. The optical fiber interconnection device of claim 18, further comprising:
at least one twenty-four-fiber module having twenty-four single ports $SF_{24}(1)$ through $SF_{24}(24)$ and optically connected to ports $1P_8(j)$, $2P_8(j)$ and $3P_8(j)$ in a polarization-preserving configuration.

20. The optical fiber interconnection device of claim 18, further comprising a fiber-arranging unit configured to optically connect the first and second sets of color-coded fibers from ports $1P_8(j)$, $2P_8(j)$ and $3P_8(j)$ to ports $P_{24}(i)$.

* * * * *